United States Patent [19]
Williamson et al.

[11] Patent Number: 6,122,641
[45] Date of Patent: *Sep. 19, 2000

[54] METHOD AND APPARATUS FOR MAPPING OBJECTS TO MULTIPLE TABLES OF A DATABASE

[75] Inventors: Richard Williamson, San Francisco; Linus Upson, Half Moon Bay, both of Calif.; Jack Greenfield, Reston, Va.; Daniel Willhite, San Francisco, Calif.

[73] Assignee: NeXT Software, Inc., Redwood City, Calif.

[ * ] Notice: This patent is subject to a terminal disclaimer.

[21] Appl. No.: 09/249,465

[22] Filed: Feb. 12, 1999

(Under 37 CFR 1.47)

Related U.S. Application Data

[63] Continuation of application No. 08/864,282, May 28, 1997, Pat. No. 5,873,093, which is a continuation of application No. 08/353,522, Dec. 7, 1994, abandoned.

[51] Int. Cl.[7] ..................................................... G06F 17/30

[52] U.S. Cl. .......................... 707/103; 707/101; 707/707; 707/102; 707/3

[58] Field of Search ............................... 707/103, 3, 101, 707/102

[56] References Cited

U.S. PATENT DOCUMENTS

| | | | |
|---|---|---|---|
| 5,261,065 | 11/1993 | Urabe et al. | 395/425 |
| 5,265,206 | 11/1993 | Shackelford et al. | 395/200 |
| 5,291,583 | 3/1994 | Bapat | 395/500 |
| 5,295,256 | 3/1994 | Bapat | 395/500 |
| 5,317,742 | 5/1994 | Bapat | 395/700 |
| 5,499,371 | 3/1996 | Henninger et al. | 395/700 |
| 5,542,078 | 7/1996 | Martel et al. | 395/600 |
| 5,550,971 | 8/1996 | Brunner et al. | 395/161 |
| 5,596,746 | 1/1997 | Shen et al. | 707/101 |
| 5,606,700 | 2/1997 | Anthias et al. | 395/683 |

OTHER PUBLICATIONS

A. Keller et al, "A C++ Binding for Penguin: a System for Data Sharing among Heterogenous Object Models," Proceedings of Foundations on Data Organization 93, Oct. 1993.

Y. Wang et al., "Cache Consistency and Concurrency Control in a Client/Server DBMS Architecture," ACM SIGMOD Int'l Conference on Management of Data, 1991, pp. 367–376.

A. Keller et al., "A Predicate–based Caching system for Client–Server Database Architectures," IEEE, publication unknown, 1994. pp. 229–238.

(List continued on next page.)

Primary Examiner—Hosain T. Alam
Assistant Examiner—Jean M. Corrielus
Attorney, Agent, or Firm—The Hecker Law Group

[57] ABSTRACT

The present invention creates a model that maps object classes in an object-oriented environment to a data source. The model maps the relationship between properties of each object class and data of the data source. The present invention can be used with a data source such as a relational database, user interface, file system, or object-oriented database. An application's object classes and data source schema are designed independent of the other since the model can be used to map one to the other. The model is comprised of entities and attributes. An entity maps to an object class and to at least one table of the DBMS. An entity contains attributes either simple or derived. A simple attribute maps to a DBMS column. A derived attribute is a combination of other attributes and does not directly map to a DBMS column. A relationship creates a link between entities of the model. A relationship can be used to flatten an attribute or flatten a relationship. A flattened attribute is an attribute of one entity that is added to another entity. A flattened relationship is created by the elimination of intermediate relationships between two entities. Relationships can be either unidirectional or bi-directional. A unidirectional relationship has a single traversal path that has a source entity and a destination. A bi-directional relationship has two traversal paths. A reflexive relationship can be created using a single entity. The model is used to synchronize object properties and the data of the data source.

20 Claims, 18 Drawing Sheets

OTHER PUBLICATIONS

A. Keller et al., "Persistence Software: Bridging Object–Oriented Programming and Relational Databases," ACM SIGMOD, May 1993, pp. 523–528.

T. Barsalou et al., "Updating Relational Databases through Object–Based Views," ACM SIGMOD, 1991, pp. 248–257.

A. Keller et al., "Enabling the Integration of Object Applications With Relational Databases," white paper publication by Persistence Software, San Mateo, California, Aug. 2, 1994.

A. Keller, "Penguin: Objects for Programs, Relations for Persistence," white paper publication by Persistence Software, San Mateo, California, no date.

M. Aritsugi et al., "Views in an Object–Oriented Persistent Programming Language," Proceedings Int'l Symposium on Next Generation Database Systems and their Applications, Sep. 1993, pp. 18–25.

T. Takahashi et al., "Querying Heterogeneous Object Views of a Relational Database," Proceedings Int'l Symposium on Next Generation Database Systems and their Applications, Sep. 1993, pp. 34–41.

K. Tanaka et al., "Obase Object Database Model: Towards a More Flexible Object–Oriented Database System," Proceedings Int'l Symposium on Next Generation Database Systems and Their Applications, Sep. 1993, pp. 159–166.

T. Ling et al., "Overview of an Object–Oriented Entity–Relationship Based Database Management System," Proceedings Int'l Symposium on Next Generation Database Systems and Their Applications, Sep. 1993, pp. 167–173.

T. Ishimaru et al., "Object–Oriented Database system for Portable Multimedia Object," Proceedings Int'l Symposium on Next Generation Database Systems and Their Applications, Sep. 1993, pp. 174–179.

T. Hochin et al., "An Extensible DBMS Composed of Specific DBMSs," Proceedings Int'l Symposium on Next Generation Database Systems and Their Applications, Sep. 1993, pp. 180–187.

Urban et al. "An Object–Oriented Query Language Interface to Relational Database in a Multidatabase Databases Environment," IEEE.

Millard et al., "Run–time support and storage management for memory–mapped persistent object," IEEE, pp 508–515.

METHOD AND APPARATUS FOR MAPPING OBJECTS TO MULTIPLE TABLES OF A DATABASE

This is a continuation of application Ser. No. 08/864,282, filed on May 28, 1997, issued Feb. 16, 1999 as U.S. Pat. No. 5,873,093, which is a continuation of application Ser. No. 08/353,522 filed on Dec. 7, 1994 now abandoned.

BACKGROUND OF THE INVENTION

1. Field of the Invention

This invention relates to mapping of data to objects in an object-oriented environment.

2. Background Art

In a database management system (DBMS), data is stored in rows of tables. Each row contains one or more fields or columns. Each column contains an item of data. For example, an employee table contains rows of employee records. Each row, or record, contains information regarding an employee. An employee record can contain, for example, a last name column that contains a last name of the employee.

Data stored in a column of a table can form the basis of a relationship between another table in the database having a related column. A relationship can also be formed using more than one column per table. Using a relationship between columns of two tables, it is possible to join these two tables to provide a single table containing instances of rows from one table combined with related rows from the other table.

Data from two or more tables can also be joined using another capability provided in a DBMS known as a view. A view provides the ability to create a virtual table. That is, the table created using a view is not considered an actual table. Therefore, some DBMS operations, such as update, cannot be performed on a view.

Like a joined table, a view contains rows from one or more tables in the database. For example, a view can contain the rows from two tables in the database, an employee and department table. Such a view may include all or some subset of the total number of columns contained in each of these tables. For example, the employee table contains "employee identification", "department identification", "last name", "first name", "street address", "city", and "zip code" columns. The department table contains "department identification", "description", "number of employees", and "budget" columns. All of the information contained in these two tables may not be pertinent or required to allow a user to be able to review employee information. For example, a department's budget figures are not pertinent to such a system. A view can be used to define a virtual table comprised of the columns in the employee table and the employee's department description from the department table. The "department identification" columns from the two tables can be used to join rows from the two tables to form the view.

Views are useful to simplify the database schema by creating subsets of the database for use with particular applications. Further, views can be used to provide security. In the above example, the exclusion of the "budget" column from the view limits accessibility or knowledge that such a column exists. Thus, a user is only made aware of the data that the user is authorized to access. One disadvantage of views is that they are read-only. Therefore, a view cannot be used to update the base tables that actually contain the data used to create a view.

Another disadvantage of views is that a DBMS restricts the operations that are required to create a view. That is, only someone with database administrator (DBA) privileges can create the virtual tables needed to map objects to the tables of the DBMS. Therefore, to develop an application including views, it is necessary to have someone with DBA privileges available throughout the development phase to make changes to existing views and create new views. Once an application that includes views is distributed to a user site, it is necessary to install the application at the user site. To install the application at the user site, someone with DBA privileges must create the views that are required by the application.

Applications are developed to provide a user with the ability to facilitate access and manipulation of the data contained in a DBMS. A DBMS includes a Data Manipulation Language (DML) such as Structured Query Language (SQL). A DML provides set-oriented relational operations for manipulating data in the DBMS. However, a DML requires a precise syntax that must be used to access and manipulate DBMS data. To use a DML, a user must understand and use the DML's syntax. Instead of requiring each user that wishes to modify a DBMS' data to learn the DML's syntax, applications are written that provide an interface between the user and a DBMS' DML.

Therefore, applications are developed that provide a user interface that allows a user to specify operations to be performed on DBMS data in a more user-friendly manner. These applications are written in a programming language such as C, objective C, and SmallTalk, for example. SQL, or another database programming language, is embedded in these general-purpose programming languages. Once a user identifies a data operation, the application uses embedded SQL statements to perform the operations on the DBMS data as directed by the user.

Some general-purpose programming languages, such as objective C and SmallTalk, are referred to as object-oriented programming languages. Object-oriented programming languages define data and the operations that can be performed on the data. Such a definition is referred to as an object. To use data stored in a DBMS in an application written in an object-oriented language, it is necessary to read data stored in the DBMS as columns within rows of a record into objects. Conversely, object data must be read from the object and stored in tables in the DBMS.

A mapping must be performed to determine what DBMS data is stored in what object, or conversely, what object data is stored in what DBMS tables. There are several disadvantages with the current object-oriented systems' techniques for mapping DBMS data to objects. First, data-to-object mapping must be represented in the program code of an application. That is, an application developer must be aware of the DBMS structure or schema and how the schema is to be mapped onto the application's objects to develop an application. Further, an application must include code to define the mapping. Therefore, the DBMS-to-object mapping is not transparent to the user (e.g., the application developer). Further, the program code needed to implement this mapping increases the size and complexity of the application. The increased coding results in an increase in the amount of the effort needed to debug and maintain the program code. Further, the DBMS-to-object mapping is not dynamic. When a change is made to the DBMS schema, the application must be re-coded to reflect the schema change.

Another disadvantage relates to the restrictions that are placed on the DBMS schema and/or DBMS-to-object mapping that can be supported by the current object-oriented systems. Using current systems, there must be a one-to-one correspondence between an object and a table in the DBMS. Therefore, the schema chosen for the DBMS data is restricted by the object definitions, or vice versa.

Further, because there must be a one-to-one correspondence between a table and object, it is not possible to map multiple tables to a single object. Thus, in the example described above, it is not possible to map the columns included in the virtual table (i.e., columns from the employee table plus the employee's department description from the department table) to the properties of a single object.

SUMMARY OF THE INVENTION

The present invention creates a model that is used to transparently map object classes in an object-oriented environment to a data source. The model maps the relationship between properties of each object class and data of the data source. For example, the model provides a mapping of the relationship between properties of each object class and columns of DBMS tables. Other data sources that can be used with the present invention include a user interface, a file system, and object-oriented database, for example.

Prior to model generation, an application's object classes and DBMS schema (when a DBMS is used as the data source) are designed. Each can be designed independent of the other since the model can be used to map one to the other. Thus, for example, a model can be used to map the object classes of an existing application to a new DBMS schema, or vice versa.

An object class definition includes properties and behavior. Properties are the data that is manipulated by the methods (behavior) of the object class. A DBMS schema specifies tables and the columns of the tables, for example. The DBMS schema specifies columns from the tables that can be used for join operations specified using a DBMS data manipulation language such as SQL.

A model is defined that maps the object classes to the DBMS schema. The mapping is performed transparently such that the object classes and DBMS schema are not necessarily aware of the mapping. For example, there is no need to implement a class to mirror or accommodate the data source's structure. Similarly, there is no need to design a data source structure based on object classes.

The model is comprised of entities, attributes and relationships. An entity represents the primary structure of the model. An entity maps to an object class and to one or more tables of the DBMS. An entity contains attributes and relationships. An attribute can be simple or derived. A simple attribute maps to a column of the DBMS. A derived attribute does not directly map to a column of the DBMS. A derived attribute can be, for example, a combination of simple attributes operated upon using a mathematical operation. Simple and derived attributes map to properties of an object class.

Relationships can be defined in the model. A relationship creates a link between at least two entities of the model. A relationship can be used to flatten an attribute or flatten a relationship. A flattened attribute is an attribute of one entity that is added to another entity. A flattened relationship is created by the elimination of an intermediate relationship between two other entities. For example, a first relationship exists between a first and second entity. A second relationship exists between the second entity and a third entity. The first and third entities are related to each other by virtue of their relationship with the second entity. A flattened relationship can be created between the first and third entities by eliminating the first and second relationships.

A relationship creates a path that is traversed to resolve the relationship. Neither the object classes nor the data source need to be aware of the traversal path. The path is traversed as needed during model definition and at runtime. During model definition, the path is traversed to resolve relationships to flatten attributes and relationships. During runtime, the path is traversed to resolve relationships to instantiate objects and synchronize objects and the DBMS.

For example, during runtime, a relationship is used to identify a join operation that must be performed in the DBMS. The relationship and the entity definitions are used to generate an SQL statement that joins the necessary tables using the tables' join columns. The result of the join is a virtual table (i.e., a subset of the tables involved in the join). Data can be extracted from virtual tables to instantiate objects and to update the actual table data using the relationship definitions defined in the model.

Relationships are unidirectional. A relationship's direction is used to resolve the relationship. A unidirectional relationship has a single traversal path that has a source entity and a destination. Relationship keys from the source and destination entities (known as source key and the destination key, respectively) are used to traverse the path. The source entity and join criteria are used as the criteria for selecting records from the destination entity based on the source and destination attributes.

A pair of unidirectional relationships can be used to create a bi-directional relationship. A bi-directional relationship has two traversal paths. One path traverses from the source entity to the destination entity. A second path traverses from the destination entity to the source entity. A bi-directional relationship is created using an auxiliary entity.

A relationship is typically created between two different entities. However, a relationship can also be created using a single entity. This type of relationship is referred to as a reflexive relationship. A reflexive entity uses the same entity as the source entity and the destination entity. One attribute of the source entity is defined as the source key while another attribute of the source entity is defined as the destination key.

The model is used at runtime to instantiate instances of an object class. Modifications made to the data by a method of an object is then propagated to the data source using the mapping provided by the model. Thus, the model is used to synchronize the data contained in an object instance and the data source.

DETAILED DESCRIPTION OF THE INVENTION

A method and apparatus for mapping objects to multiple tables of a database is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
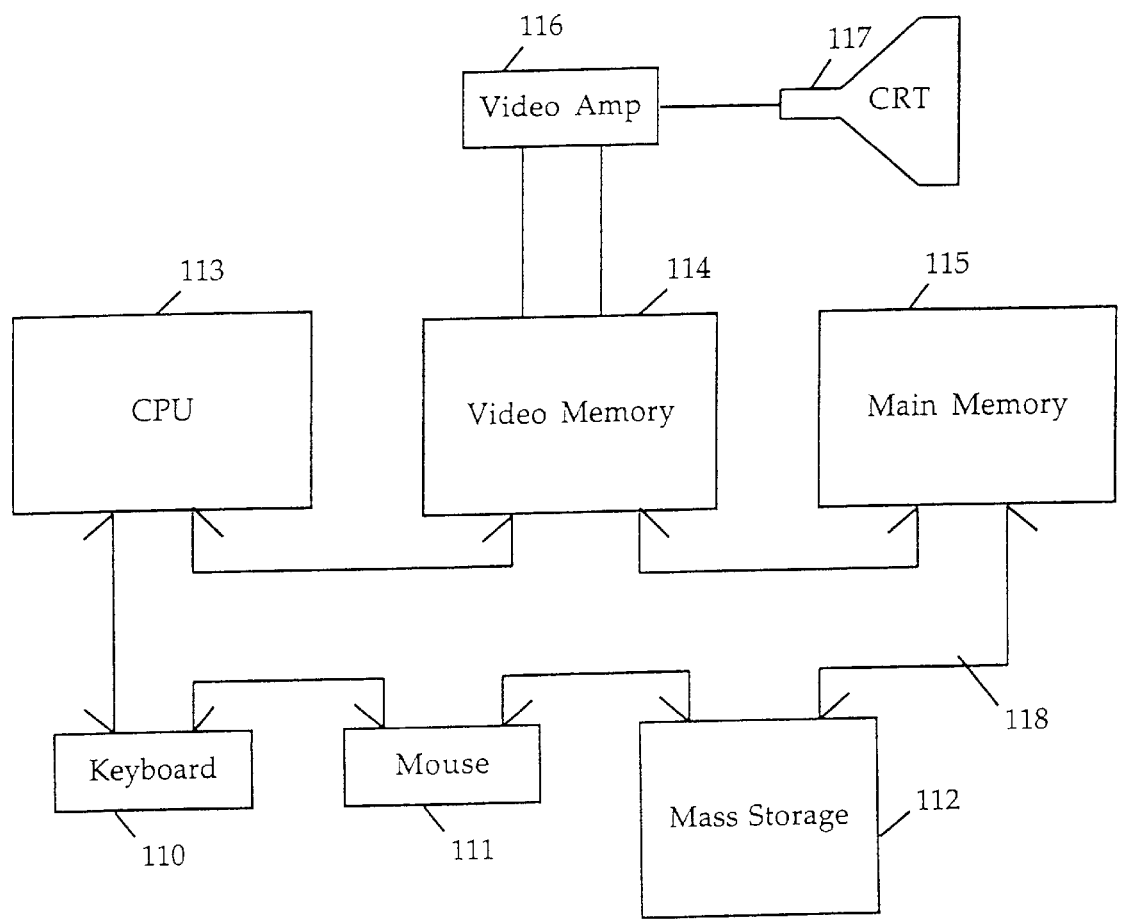
FIG. 1 illustrates an example of a computer system used to implement the present invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

Figure 2:
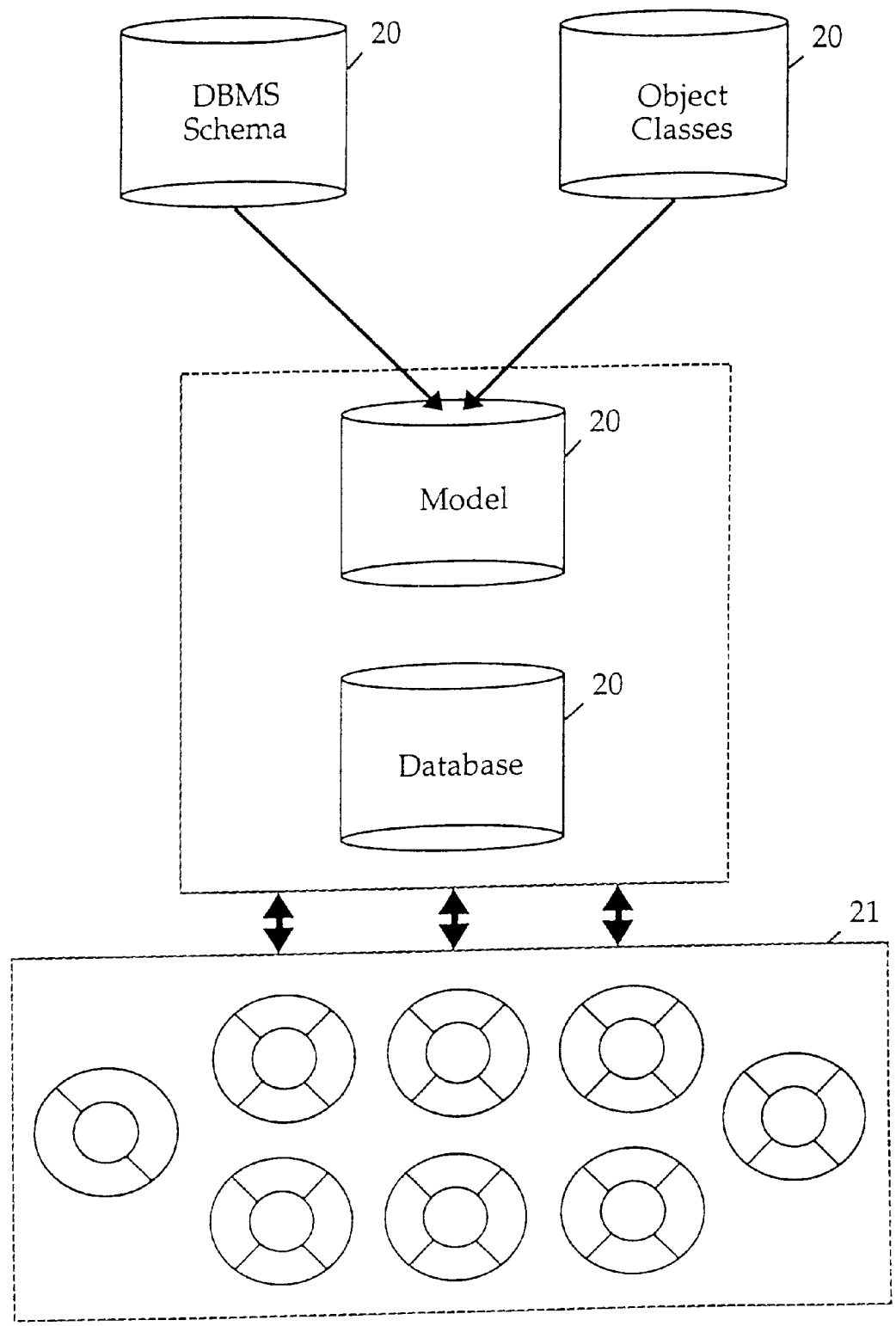
FIG. 2 provides an overview of the present invention using a DBMS as a data source.

The present invention uses a model to map a data source to objects in an object-oriented environment. The data source can be a DBMS, for example. However, a user interface, a file system, object-oriented database, or other data storage system can be used. FIG. 2 provides an overview of the present invention using a DBMS as the data source. DBMS schema 202 represents the structure of a database. DBMS schema 202 provides information regarding the tables and columns of the database, for example. The primary and foreign keys defined for each table are included in the DBMS schema 202.

Object classes 204 include the objects defined to manipulate data for a given application. For example, a personnel application, may have objects that manipulate organizational data for a business. Such an application has an employee object, for example, that updates an employee's data. Another object updates department information, for example. For such an application, DBMS schema 202 has an employee table that contains employee information and a department table that contains data associated with the organization's departments, for example.

DBMS schema 202 and object classes 204 are used to build a model that maps the DBMS schema 202 to the object classes 204. The mapping is performed transparently such that the object classes and DBMS schema are not aware of the other's structure. Model 206 can then be used at runtime in conjunction with the data in the database 208 to instantiate objects 210 of the application. Objects 210 manipulate the data according to their definition. Model 206 is further used to map the modifications made by objects 210 into database 208.

Figure 3:
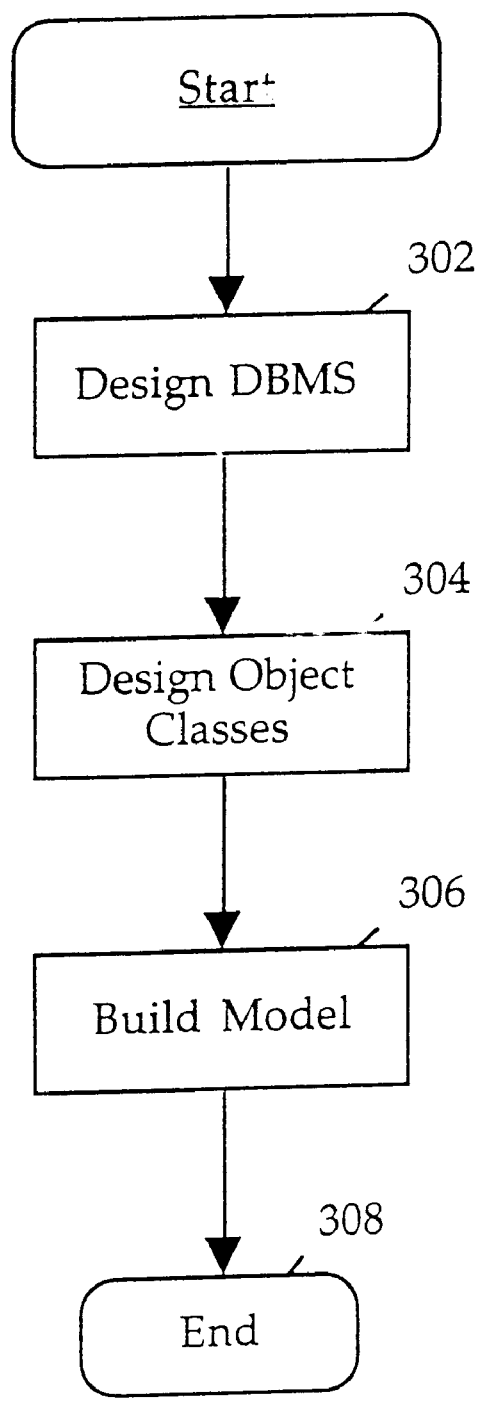
FIG. 3 provides an overview of a process flow for generating a model.

FIG. 3 illustrates an overview of the process flow for generating a model. At block 302, a DBMS is designed. The DBMS includes the structure for the data to be used in the application. At block 304, the object classes to manipulate the data are designed. Each object class is defined by the data manipulated by the object class and the operations performed on the data. Using the DBMS and the object classes, a model is generated at block 306.

Figure 6:
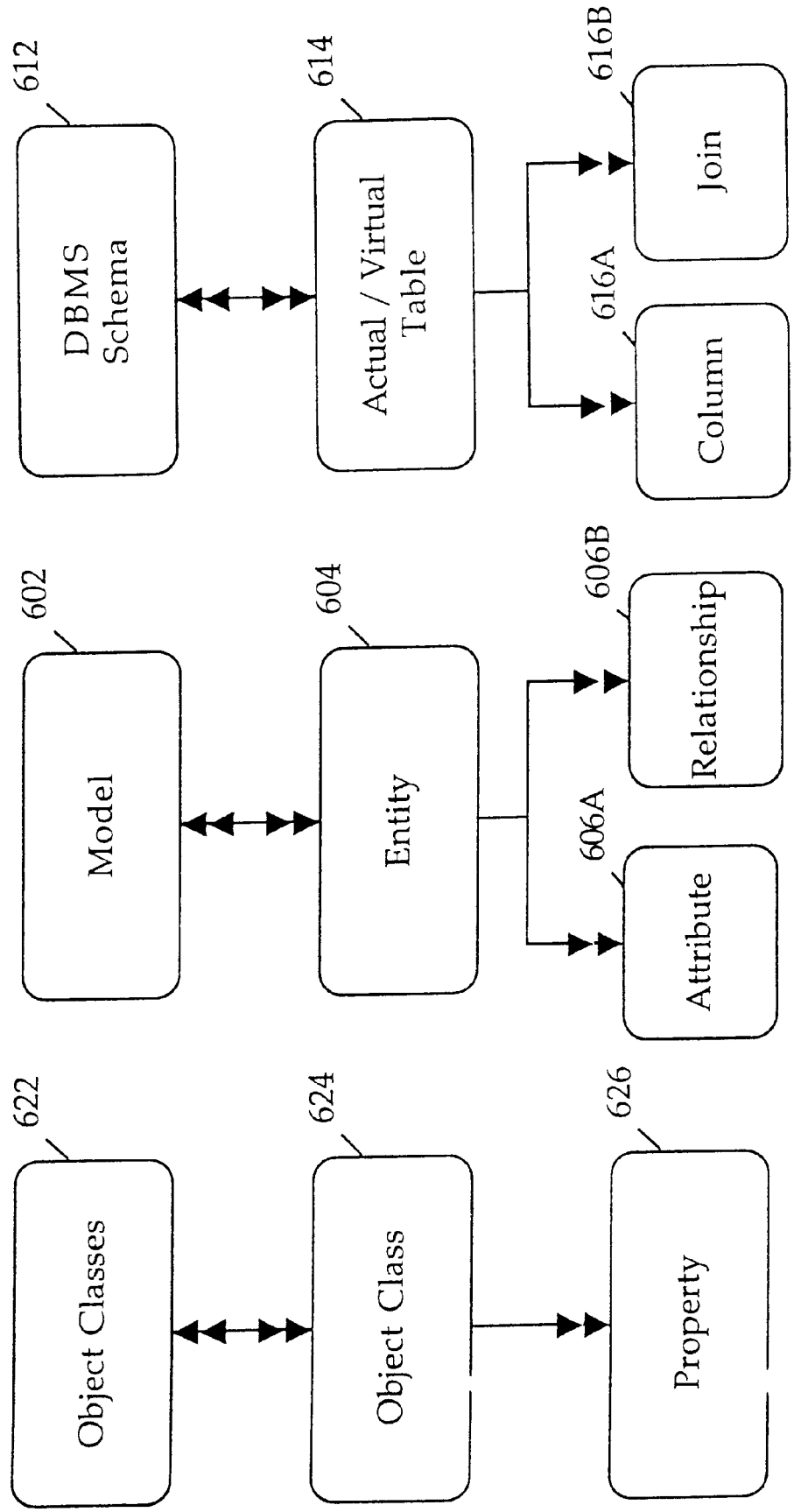
FIG. 6 provides an illustration of the mapping provided by a model used in the present invention.

As described in FIGS. 2 and 3, model 206 is generated using the DBMS schema 202 and the object classes 204. Model 206 maps the data between the DBMS schema 202 and the object classes 204. The mapping is performed transparently such that the object classes and DBMS schema are not necessarily aware of the mapping. For example, there is no need to implement a class to accommodate the data source's structure. Similarly, there is no need to design a data source structure based on object classes. FIG. 6 provides an illustration of the mapping provided by model 206. Referring to FIG. 6, object classes 622, model 602, and DBMS schema 612 correspond to object classes 204, model 206, and DBMS schema 202, respectively.

Model 602 is comprised of zero, one or more instances of entity 604. (The double arrows directed toward entity 604 indicates a "to-many" relationship.) Each entity 604 can be included in zero, one, or more instances of model 602 (as indicated by the double arrows directed from entity 604 to model 602). Each entity 604 is defined by zero, one or more instances of attribute 606A or relationship 606B. A relationship 606B is an affiliation between one or more instances of entity 604.

Entity 604 and attribute 606A represent structures that contain data. Using DBMS schema 612, for example, entity 604 represents a table 614 and attribute 606A represents a column 616A of table 614. Table 614 is comprised of records or rows. Each row of table 614 is an instance of entity 604. For example, an employee record of an employee table is an instance of an employee entity. Each instance of entity 604 maps to an instance of object class 624. Object class 624 is an instance of Object classes 622. Object class 624 is comprised of zero, one, or many instances of property 626. A property maps to an attribute 606A or property 626 is derived from other instances of property 626, for example.

Attribute 606A of entity 604 is either a simple attribute or derived attribute. A simple attribute maps to an instance of column 616A having the same name, for example. A derived attribute is not mapped to a specific instance of column 616A. A derived attribute can be a combination of instances of column 616A, for example. Relationship 606B provides the ability to define an instance of entity 604 that maps to multiple instances of table 614. An instance of entity 604 that maps to multiple instances of table 614 maps to a virtual table that does not actually exist in DBMS schema 612. The virtual table maps to one or more instances of actual tables of DBMS schema 612.

Relationship 606B provides the ability to add attributes from other instances of entity 604. The process of adding attributes from other instances of entity 604 is known as flattening. A flattened attribute is an attribute 606A of a first instance of entity 604 that is included in a second instance of entity 604 using relationship 606B. A relationship 606B that exists between an intermediate instance of entity 604 and two other instances of entity 604 each having a relationship with the intermediate instance can be flattened. A flattened relationship is created between the two instances without traversing the relationship that the two entities have with the intermediate entity.

Relationship 606B corresponds to a join 616B of DBMS schema 612. Relationship 606B pairs an instance of attribute 606A (a source attribute) of the first instance of entity 604 with an instance of attribute 606A (a destination attribute) of the second instance of entity 604. Relationship 606B is similar to a join 616B of DBMS schema 612. Join 616B pairs an instance column 616A (a source column) of a first instance of table 614 and an instance of column 616A (a destination column) of a second instance of table 614 to create records that combine some or all of the instances of column 616B from the first and second instances of table 614.

There are different types of join 616B. For example, join 616B can be an inner join, a right outer join, a left outer join, or a full outer join. Using an inner join, if a destination record cannot be found for a given source record, the source record is not included in the resulting join. Destination records that do not match to any source records are not included in the resulting join. Using a right outer join, destination records that to do match to a source record are included; however, source records that do not have destination records are not included in resulting join. In a left outer join, source records that have a matching destination record are included in the resulting join; however, destination records that do not match to a source record are not included in the join. In a full outer join, all source records from both tables are included in the result of the join.

Join 616B further uses join operators to perform the join. Such operators include less than ("<"), greater than (">"), equal to ("="), less than or equal to ("≦"), greater than or equal to ("≧"), and not equal to ("<>"). The join operator is used to specify how the destination column (or attribute) relates to the source column (or attribute). Therefore, joins and relationships are not limited to cases where the source and destination column (or attribute) are equal. Instead, it is possible, for example, to specify a join (or relationship) where the destination column (or attribute) is greater than the value of the source column (or attribute).

DBMS Schema

Figure 4:
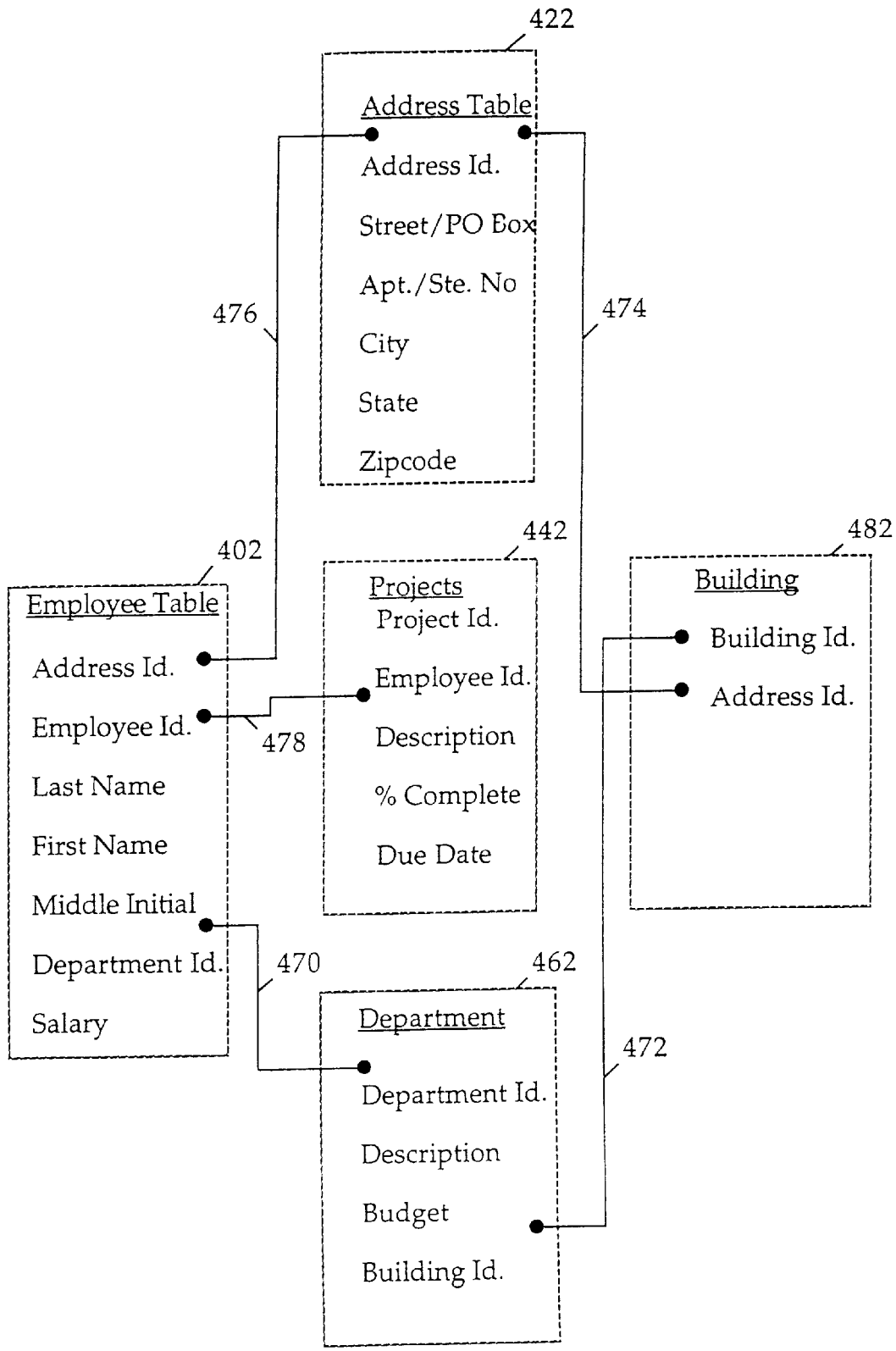
FIG. 4 illustrates a portion of a DBMS schema adapted for use with a personnel application.

As described in conjunction with FIG. 6, DBMS schema 612 is comprised of instances of table 614. Table 614 is comprised of instances of column 616A. Instances of column 616A are used with a join 616B to join instances of table 614. FIG. 4 illustrates a portion of a DBMS schema adapted for use with a personnel application. The DBMS schema of FIG. 4 includes five tables: employee table 402, address table 422, projects table 442, department table 462, and building table 482.

Employee table 402 contains columns "Address Id.", "Employee Id.", "Last Name", "First Name", "Middle Initial", "Department Id.", and "Salary". A table in a DBMS typically uses one or more columns to uniquely identify a record in the table. A column that uniquely identifies a record in a table is referred to as a primary key. Where two or more columns are used to uniquely identify a record, the columns are referred to as a compound primary key. The value of the primary key can represent a "real-world" value such as social security number, or the primary key can be a value that is created and used by the application. Employee table 402 uses the "Employee Id." value as the primary key.

A table can also contain a column that is the primary key of another table. Such a column is referred to as a foreign key. Employee table 402 includes two foreign keys, "Address Id." and "Department Id.". The "Address Id." foreign key of employee table 402 is the primary key of address table 422, for example. The "Department Id." foreign key of employee table 402 is the primary key of department table 462.

Using the "Department Id." foreign key of employee table 402 and the "Department Id." primary key of department table 462, a join 470 can be performed between employee table 402 and department table 462. The resulting join (each record of the resulting join) can include some or all of the columns from employee table 40 and some or all of the columns from department table 462. Other joins can be similarly defined using primary and foreign keys, for example, between: employee table 402 and projects table 442 (join 478), employee table 402 and address table 422 (join 476), department table 462 and building 482 (join 472), and between building table 482 and address table 422 (join 474).

Object Classes

In addition to defining a DBMS schema for the data to be used in an object-oriented application, object classes are defined to manipulate the data. As previously indicated, an object is comprised of properties (i.e., data) and behavior (i.e., method or operations to manipulate the data). An object's properties can be persistent properties that are used by the application and stored in the DBMS. Other properties are considered to be temporary properties because they are used within the application, but they are not stored in the DBMS. Temporary properties, for example, may be computed from the values of persistent properties or other temporary properties. Temporary properties can also be used as flags that indicate a certain state in the application, for example.

Figure 5:
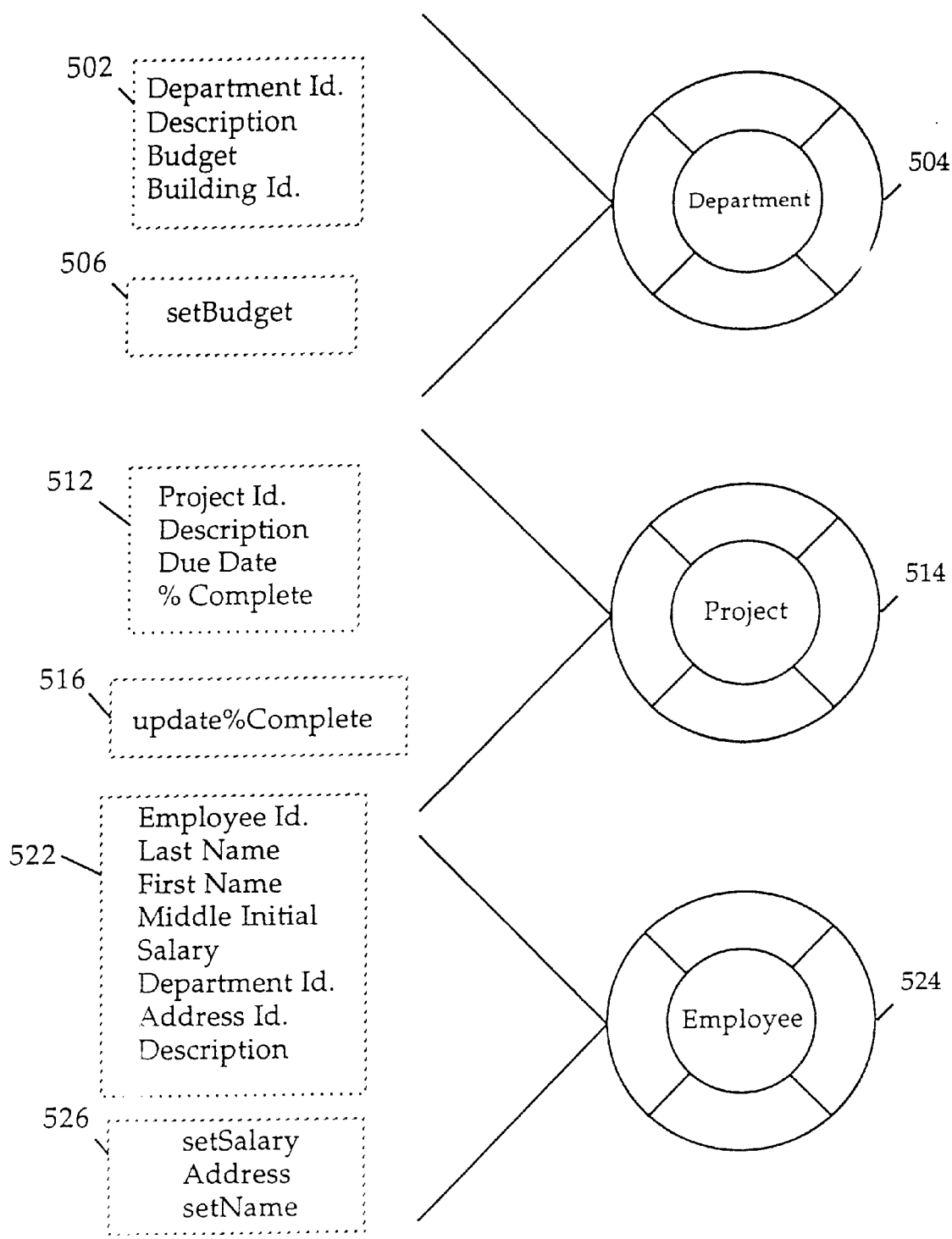
FIG. 5 illustrates some of the object classes for use with a personnel application.

FIG. 5 identifies three objects: department object 504, project object 514, and employee object 524. Each object has properties 502, 512, and 522, respectively. Department object 504 contains properties 502 that represent information about a department such as "Department Id.", "Description", "Budget", and "Building Id.", for example. Similarly, the project object 514 contains the following project information, for example: "Project Id.", "Description", "Due Date", and "% Complete". Employee object 524 contains properties related to an employee such as "Employee id.", "Last Name", "First Name", "Middle Initial", "Salary", "Department Id", and "Address", for example.

Each object's definition in FIG. 5 contains a definition of the object's. behavior. An object's behavior is implemented as one or more methods that operate on one or more properties of the object. For example, employee object 524 can contain a method to set an employee's salary ("setSalary"), define an employee's address ("Address"), or specify an employee's name ("setName"). The method to set an employee's salary operates on the "salary" property of the employee object, for example. The "Address" method modifies an employee's address. The "setName" method modifies the "Last Name", "First Name", and "Middle Initial" values for an employee.

Other examples of object classes include department object 504 and project object 514. Department object 504 includes properties 502 (i.e., "Department Id.", "Description", "Budget", "Building Id."), for example. Department object 504 contains, for example, a method to set a department's budget. Project object 514 has properties 512 including "Project Id.", "Description", "Due Date", and "% Complete", for example. Project object 514 includes, for example, a method ("update%Complete") to update the "% Complete" property.

Model

Once object classes and a DBMS schema are defined, a model can be defined to establish a mapping between the classes and the DBMS schema. The model maps the relationship between persistent properties of each object class and the columns, or fields, in DBMS tables. The mapping is performed transparently such that the object classes and DBMS schema are unaware of the structure of the other. For example, there is no need to implement a class to mirror the data source's structure, or to design a data source structure based on object classes.

In the preferred embodiment, an interactive approach is used to generate a model. Using an interactive approach, a series of displays can be provided to a user to display a current model and allow the model to be updated. A current model can initially be empty or contain an existing model. An existing model may, for example, be created using the DBMS schema. An existing model can be a model that has previously been customized for use with the application, for example. The interactive model generation approach is used to customize, or update, the current model to accommodate an application's design.

Other model generation approaches can be used in conjunction with the present invention to generate a model. For example, a language can be developed such that one or more statements using this language can be written to define the model. Statements written using this language express a model definition. These statements are submitted to a model generation engine, for example. The model generation engine parses the statements and uses the statements to update the model.

Figure 7:
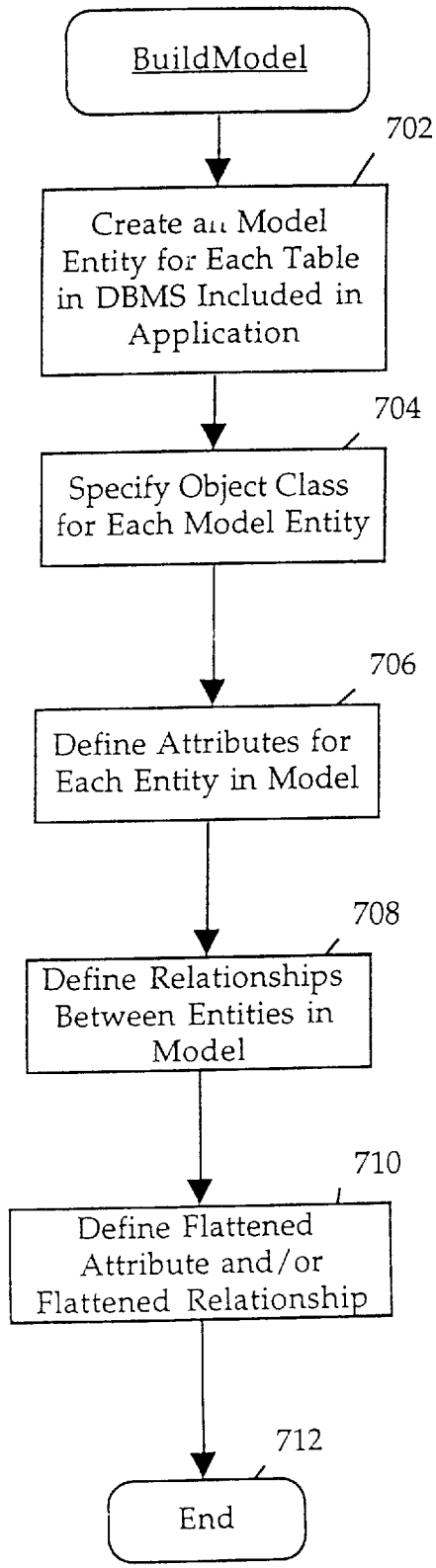
FIG. 7 provides a model generation process flow.
Figure 8:
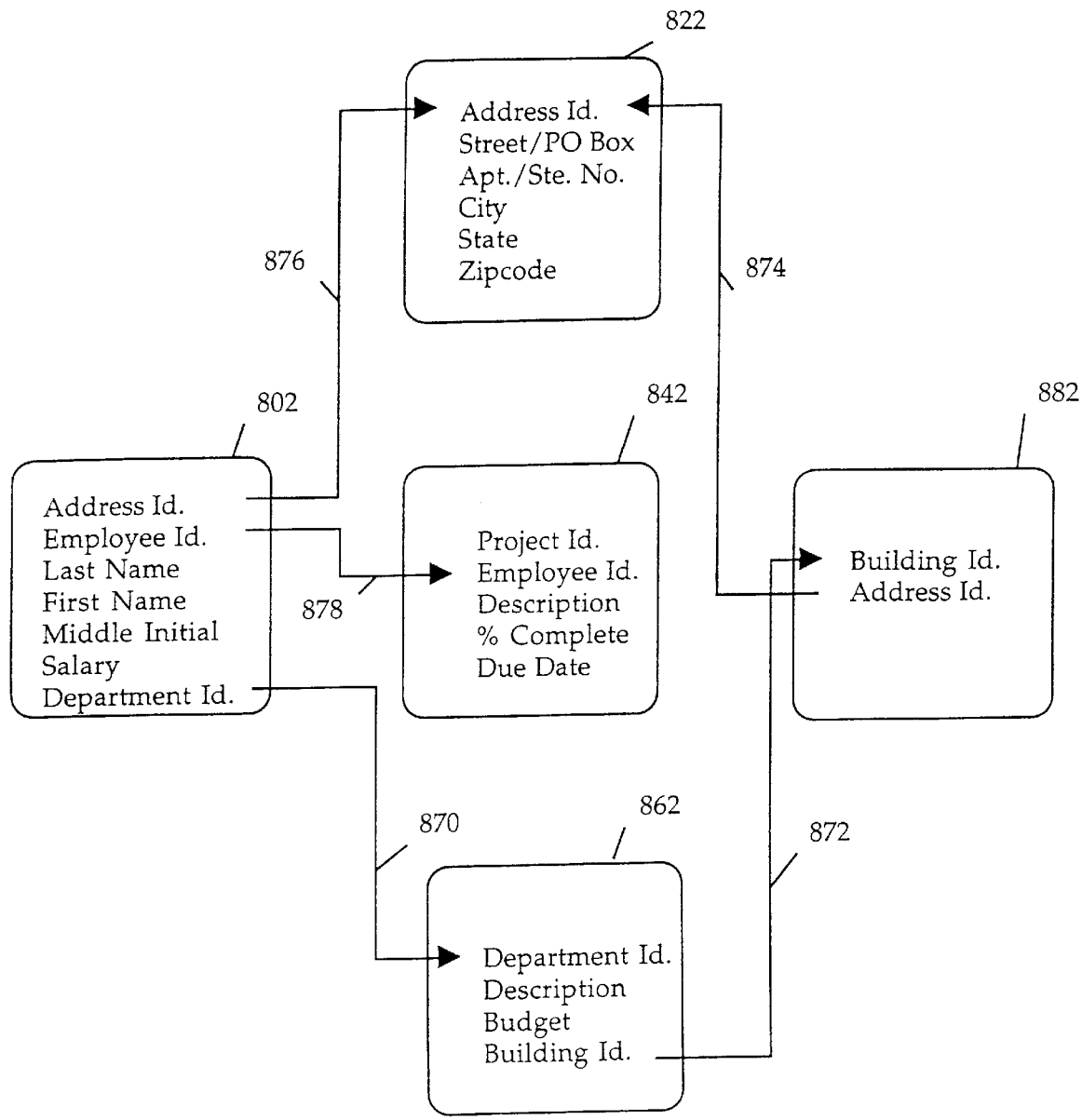
FIG. 8 provides an example of a model generated using the model generation process flow of FIG. 7.

Using any approach to define a model, a current model is used to specify a mapping between the DBMS and object classes. FIG. 7 illustrates a process for creating a model that defines the relationship between a DBMS and object classes and between columns of tables of a DBMS with properties of object classes. FIG. 8 illustrates a model generated using the model generation process of FIG. 7.

At block 702, a model entity is created for each database table in the DBMS schema of the application. Referring to FIG. 8, model entities 802, 822, 842, 862, and 882 are created and correspond to DBMS tables 402 (employee table), 422 (address table), 442 (project table), 462 (department table), and 482 (building table), for example. At block 704, an object class is associated with a model entity. For example, referring to FIG. 5, the employee model entity 802 is associated with the employee object class 524, project object class 514 is associated with project model entity 842, and department object class 504 is associated with department model entity 862.

By associating an object class with an entity, the model-DBMS mapping is applied to the associated object class. This enables an object class to remain synchronized with the DBMS during runtime. Thus, an object's properties can be mapped to columns in DBMS tables via the model (i.e., the entity to DBMS table mapping). When an object modifies its properties, the modifications can be propagated to tables in the DBMS. Conversely, when modifications are made to columns in the DBMS, the modifications can be propagated to properties of an object. Therefore, a class of objects can remain synchronized with the DBMS.

At block 706, the attributes for each entity in the model are defined. An attribute is an identifiable characteristic of an entity. An attribute is a simple attribute, derived attribute, or a relationship. A simple attribute corresponds directly to a single column of a DBMS table. A derived attribute does not map directly to a single column of a DBMS table. A derived attribute is derived based on the value of one or more other attributes. For example, a derived attribute, "Total Income" is the result of the addition of an employee's "Salary" and "Bonus" attribute values.

At block 708, relationships are created between at least two entities in the model entities are generated. A relationship creates a link between at least two entities and the objects associated with the entities. A relationship creates a mapping between an object and one or more tables of the DBMS.

At block 710, one or more relationships that are created at block 708 can be used to define a flattened attribute or a flattened relationship for an entity. A flattened attribute uses a relationship formed between entities to allow one entity to contain the attributes of another entity. A flattened relationship creates a direct relationship between entities that are otherwise indirectly related via intermediate entities. For example, a first entity and a second entity are directly related via a relationship and the second entity and a third entity are related via a direct relationship. The relationship between the first entity and the second entity and the relationship between the second entity and the third entity are flattened to create a relationship between the first and third entities.

Flattened Attribute

The present invention provides the ability to define a flattened attribute. A flattened attribute is a special kind of derived attribute that provides the ability to add an attribute from one entity to another entity by traversing a relationship. Using a flattened attribute, an entity and an object associated with the entity are mapped to columns contained in more than one table of the DBMS.

Flattening an attribute creates a join between two or more tables in a DBMS. In a DBMS, a join is an operation that provides access to data from more than one table at the same time. The join is performed using a related column from each table. These columns are referred to as join columns. For example, referring to FIG. 4, the employee table 402 can be joined with the department table 462 using the "Department Id." columns from the two tables. By joining a row from each table when the values in the join columns are equal, a combined row is created that includes the information about an employee from the employee table 402 and the information about the department to which the employee is assigned from department table 462.

In the model, a flattened attribute provides the ability to join attributes from multiple model entities. Thus, for example, the employee entity 802 can contain the description of the department (from the department model entity 862) to which an employee is assigned. Further, the employee's address attributes (from the address model entity 822) can be included in the employee model entity 822, for example.

Referring to FIG. 8, model entity 802 is the model entity associated with the employee table 402 of FIG. 4. Referring to FIG. 4, employee table 402 contains a join column, "Department Id." that corresponds to a join column, "Department Id." of the Department table 462. Referring to FIG. 8, model entity 802 contains an attribute, "Department Id., that corresponds to the "Department Id." attribute in department entity 862. A "toDepartment" relationship 870 can be created between the employee table 402 and department table 462 using these two attributes.

To flatten an attribute, a relationship is first created between the entities. An attribute from each model entity is identified as a relationship key. Two relationship keys, a source key and a destination key, are defined to establish a traversal path between the entities having the flattened attribute relationship. The source key is defined for the source model entity and a destination key is defined for the destination model entity. The source key establishes the comparison criteria used to resolve the relationship. The destination key provides input for the comparison to the source key. A traversal path is used to allow the inclusion of one entity's attributes in another entity to define the model. Further, the traversal path is used to resolve a relationship between objects at runtime. Runtime resolution of object relationships is discussed below.

Figure 10:
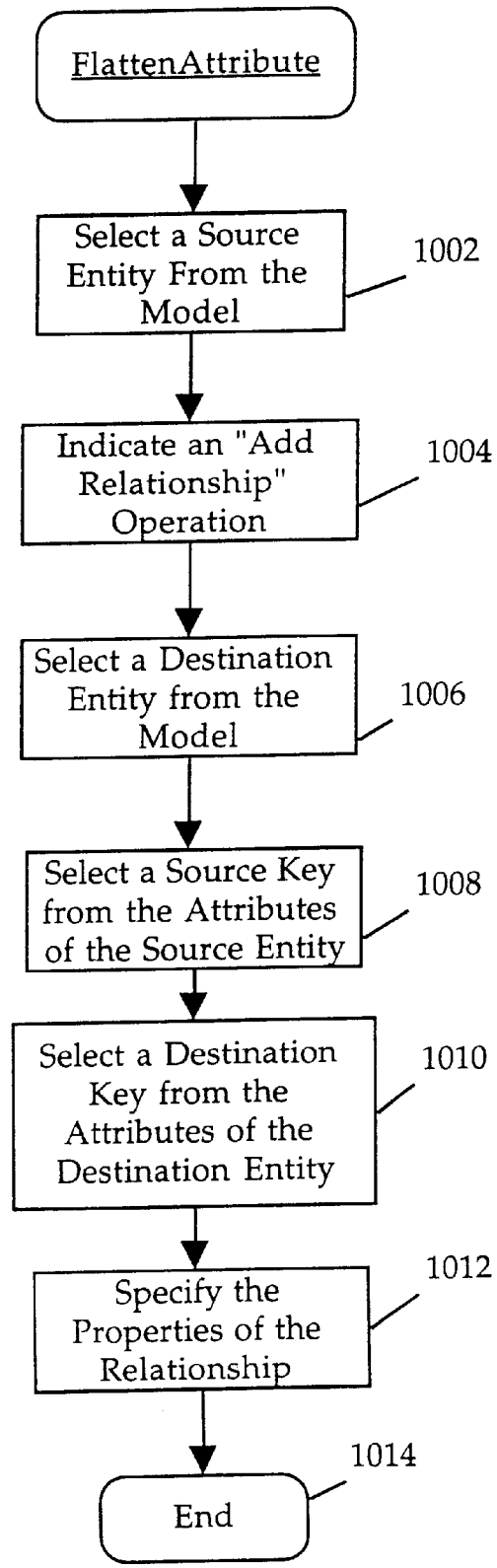
FIG. 10 illustrates a flatteningAttribute process flow.

FIG. 10 illustrates a flatteningAttribute process flow using the interactive approach of the preferred embodiment. To flatten an attribute during model definition, a traversal path is defined between the entities having the flattened attribute relationship. The traversal path is defined by identifying source and destination model entities and identifying the relationship keys of both these entities. Once the traversal path is defined, the traversal path is used to resolve the relationship between the entities (and the associated object classes). Thus, at block 1002, a source entity is selected from the model. An "add relationship" operation is specified at block 1004. At block 1006, a destination entity is selected from the model. A source key is selected from the attributes of the source entity at block 1008. At block 1010, a destination key is selected from the attributes of the destination entity. At this point, a traversal path between the source and destination entities is defined.

At block 1012, the properties of the relationship can be defined. Properties of the relationship include, for example, the type of join, the operator to be used to perform the join, and the relationship's cardinality. The join can be, for example, an inner join, full outer join, left outer join, or right outer join. The join operator further refines the criteria used when the join is performed. For example, if an equals ("=") operator is specified, an equijoin is performed. Using an equijoin, records from the destination entity are joined with the source record only when the source and destination keys have equal values. The cardinality specifies whether the relationship is a "to-one" or "to-many" relationship between the source and destination entities.

Once a relationship, or traversal path, is defined between two entities, the attributes of the destination entity can be added to the source entity. Referring to FIG. 8, the "Description" attribute of the department entity 862 is to be included in the employee entity 802. By doing so, an employee's department description is supplied to the employee object 524 that is associated with the employee entity 802 when the employee object 524 is instantiated at runtime. A relationship must be established between the employee entity 802 and the department entity 862. A traversal path is chosen between the two entities. The employee entity 802 is chosen as the source entity since the flattened attribute is to be added to this entity. The entity containing the attribute to be flattened is chosen as the destination.

The "Department Id." attributes of the two entities are selected as the relationship keys. Each department has a "Department Id." that uniquely identifies a department instance. Each employee has a "Department Id." that points to a unique instance of department. Therefore, the relationship between employee model entity 802 and the department model entity 862 can be resolved using the "Department Id." attribute for both entities.

Using the "Department Id." attribute as the relationship key, a "toDepartment" relationship 870 is defined between the employee entity 802 and department entity 862. The "toDepartment" relationship 870 is retained as part of the model definition.

Figure 9A:
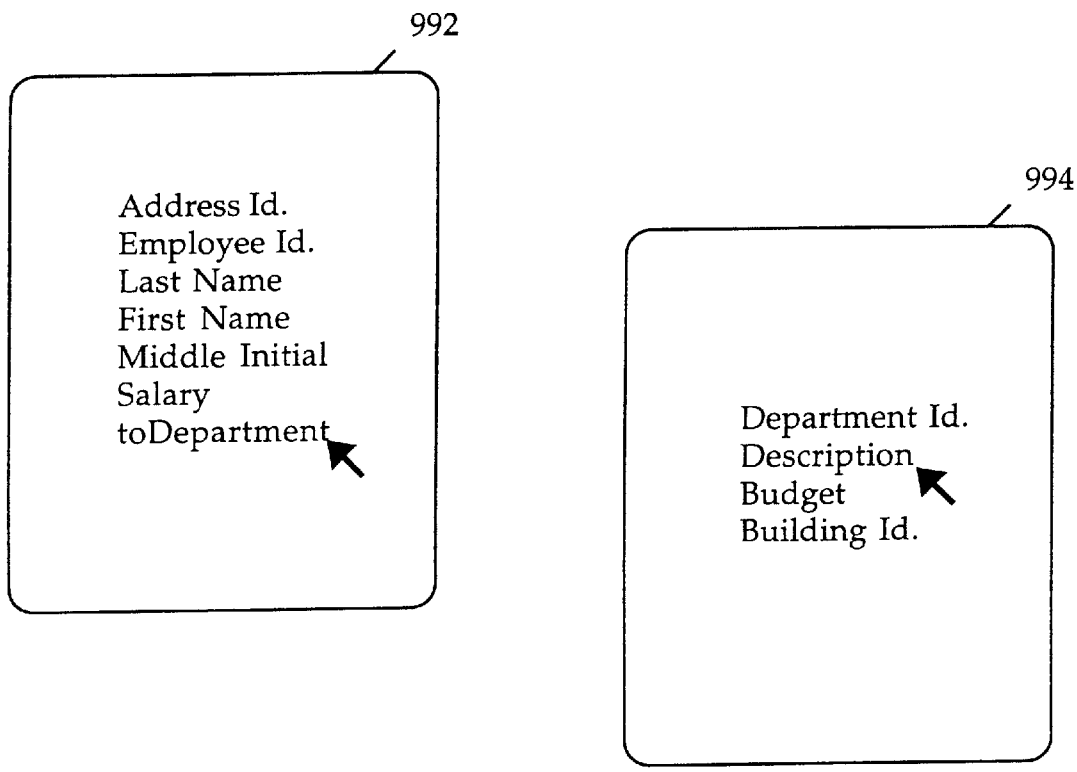
FIG. 9A provides an illustration of displays presented to a user to define a flattened attribute.
Figure 9B:
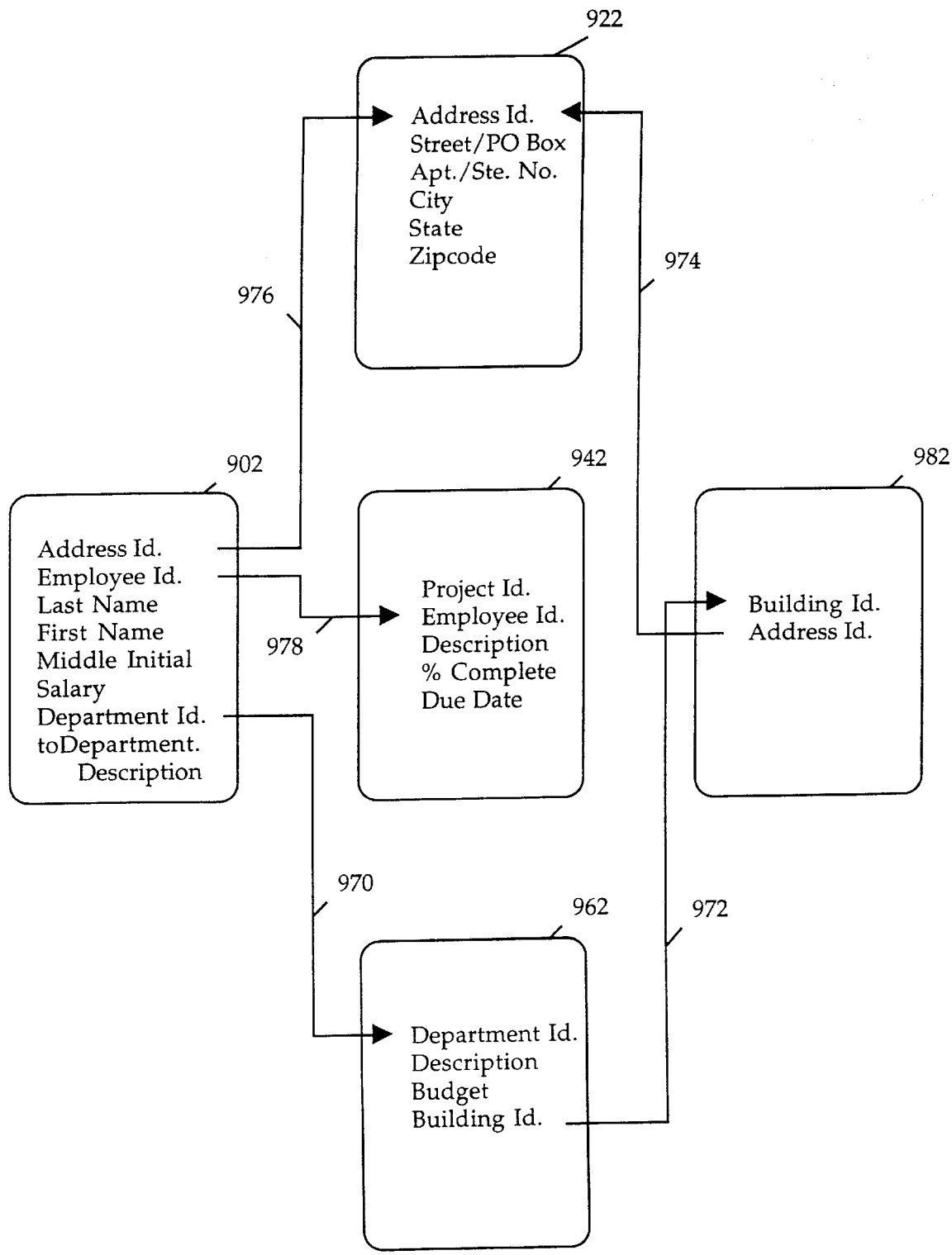
FIG. 9B illustrates an update of the model definition of FIG. 8 including a flattened attribute entry.

In the preferred embodiment, the "toDepartment" relationship 870 is displayed to the user as an attribute of the employee entity 802 as illustrated in FIG. 9A, for example. Using the interactive approach of the preferred embodiment, for example, the "toDepartment" attribute of the employee entity display 992 is selected (e.g., using a pointer device such as a mouse) to invoke a department entity display 994 of the department entity 862. The attributes of the department entity 962 to be flattened into the employee entity 902 are then selected from the department entity display 994. The "Description" attribute of the department entity display 994 is selected to be included in the employee entity 802. FIG. 9B illustrates an update of the model definition of FIG. 8 that includes the flattened attribute in employee entity 902, "toDepartment.Description".

The attribute name "toDepartment.Description" is used herein to illustrate the traversal path and the attribute selected from the destination entity and included in the source entity. The traversal path and the selected attribute define the flattened attribute. This definition (e.g., "toDepartment.Description") is maintained in the model definition. However, a different reference name, such as "Description", can be used to refer to the flattened attribute external to the model definition. Therefore, for example, an object class can use the reference name "Description" to identify the "toDepartment.Description" flattened attribute of the employee entity 902.

As previously described, the employee entity 802 is mapped to the employee table 402 and the department entity is mapped to the department table 462. By flattening the "Description" attribute of the department entity into the employee entity 902, the employee entity maps to two DBMS tables, the employee table 402 and the department table 462. By flattening the "Description" attribute of the department entity 862 into the employee entity 902, the employee object 524 extends across (maps to) both the employee table 402 and the department table 462. The object class associated with employee entity 902, employee object 524, is therefore mapped to multiple tables.

Referring to FIG. 8, other examples of relationships are illustrated. For example, a "toAddress" relationship 876 between the employee entity 802 and address entity 822 is defined using the "Address Id." attribute of each entity to establish a traversal path. Using the employee entity 802 as the source entity, the attributes of the address entity 822 can be flattened into the employee entity. Thus, some or all of the employee's address becomes part of the attributes of the employee entity 802.

Similarly, a "toProject" relationship 878 is defined between the employee entity 802 and the project entity 842 using the "Employee Id." attributes. A "toBuilding" relationship 872 is defined between the department entity 862 and the building entity 882 using the "Building Id." attributes of the two entities. Using the "Address Id." attributes of the building entity 882 and the address entity 822, a "toAddress" relationship 874 is established between the two entities.

In the above examples, a simple key is used as a relationship key. A simple key is comprised of a single attribute. However, a compound key can be used as a relationship key. A compound key is a key that combines at least two attributes. In this case, the group of attributes that comprise the compound, taken in combination, can uniquely identify an instance of the destination entity.

Relationships are unidirectional. That is, the path that leads from the source entity to the destination entity is not traveled in the opposite direction. Unidirectionality is enforced by the way in which a relationship is resolved. As described above, the resolution of a relationship is accomplished by finding the correct destination record(s) for a given source record.

Unidirectional relationships can be used to create a bi-directional relationship. Two traversal paths exist between two entities (a source entity and a destination entity) having a bi-directional relationship. One path traverses from the source entity to the destination entity. A second path traverses from the destination entity to the source entity. For example, a model includes relationships "A" and "B". Relationship "A" is the inverse of relationship "B". Effectively, relationship "A" has as its source entity and its source attributes, the destination entity and destination attributes of relationship "B". Relationship "B" has as its source entity and its source attributes, the destination entity and destination attributes of relationship "A".

Figure 12:
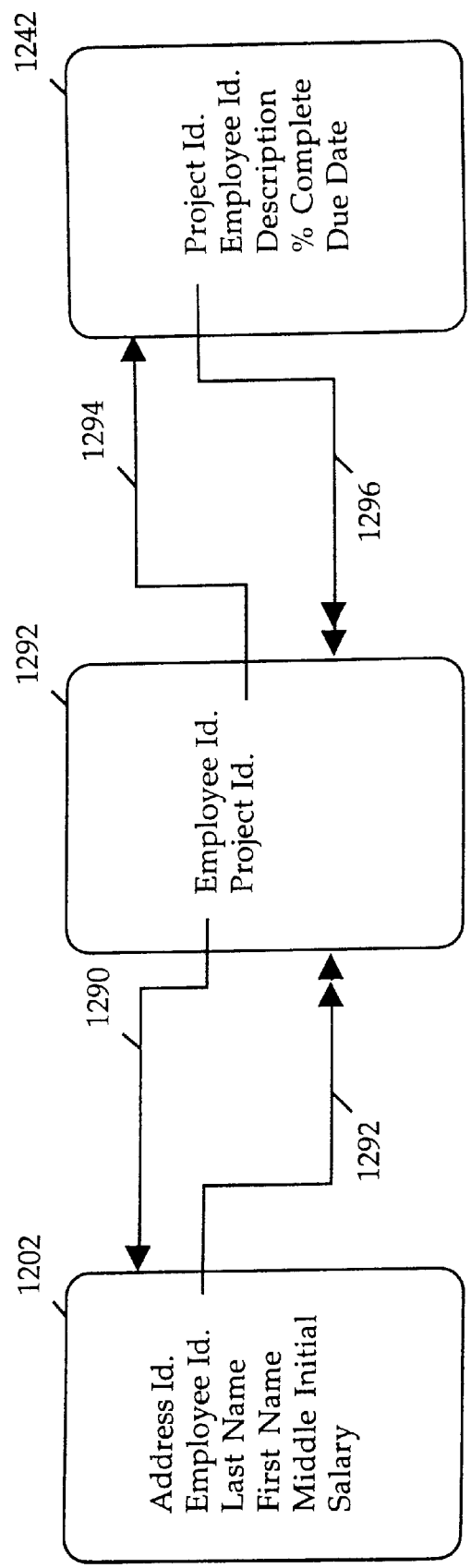
FIG. 12 illustrates a bi-directional relationship using an auxiliary entity.

A bi-directional relationship may be created using any technique for establishing a dual relationship between entities. For example, a bi-directional relationship between two entities is created using an auxiliary entity. The creation of an auxiliary entity between the two entities creates a network of relationships between the two entities via the auxiliary entity. FIG. 12 illustrates a bi-directional relationship using an auxiliary entity.

The employee entity 1202 and project entity 1242 are the same as the employee entity 802 and project entity 842 described above. EmployeeProject entity 1292 is the auxiliary entity that creates the relationship network between employee entity 1202 and project entity 1242. The employeeProject entity 1292 uses a compound key consisting of "Employee Id." and "Project Id.". The table associated with the employeeProject 1292 holds a different record for each employee of every project. The compound key uniquely identifies each record in the table associated with the employeeProject entity 1292.

The relationships between the entities are created as described above. Employee entity 1202 has two relationships 1290 and 1292 with employeeProject entity 1292. In relationship 1290, employeeProject entity 1292 is the source entity and employee entity 1202 is the destination entity. The "Employee Id." attributes of the employee entity 1202 and employeeProject entity 1292 are the relationship keys. The traversal path of relationship 1290 is illustrated by the arrow pointing toward employee entity 1202 from employeeProject 1292. The single arrow indicates a "to-one" relationship. In a "to-one" relationship, there is exactly one destination record for each source record. Thus, for each employee Project instance, there is exactly one employee instance. A second relationship exists from the employee entity 1202 (the source entity) to the employeeProject entity 1292 (the destination entity). As illustrated by the double arrows of relationship 1292, for each employee instance there are zero, one, or many employeeProject instances. Thus, each employee can be assigned none to many projects.

Similarly, there are two relationships (1294 and 1296) between employeeProject entity 1292 and project entity 1242. Relationship 1294 creates a "to-one" relationship between the employeeProject entity 1292 and project entity 1242 using the "Project Id." as the relationship key. Relationship 1296 is a "to-many" relationship. Thus, for each project instance, there are zero, one, or many employeeProject instances.

Using the employeeProject entity 1292 as an auxiliary entity, a "many-to-many" relationship is created between the employee entity 1202 and project entity 1242. Thus, each employee can be assigned to zero, one, or many projects. Similarly, each project can have zero, one, or many employees working on the project. Further, the employeeProject entity 1292 creates a bi-directional relationship between the employee entity 1202 and project entity 1242.

In the examples provided above, the source and destination entities are different entities in the model. However, it is possible for the source and destination entities to be the same entity. The relationship created using the same entity as the source and destination entity is referred to as a reflexive relationship. Reflexive relationships provide the ability for an instance of an entity to point to another instance of the same entity. Reflexive relationships can represent an arbitrarily deep recursion.

Figure 13:
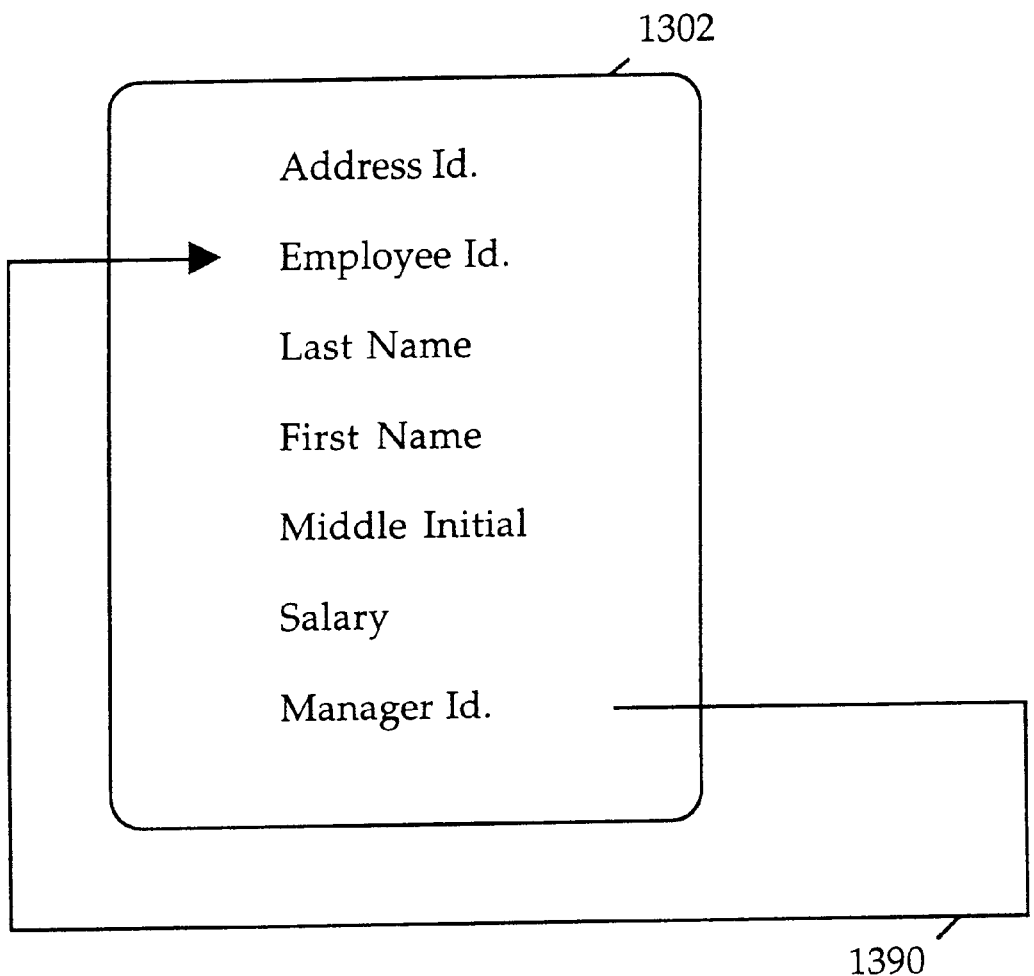
FIG. 13 illustrates a reflexive relationship.

FIG. 13 illustrates a reflexive relationship. Instead of creating a separate manager entity, the employee entity 1302 can be used for a manager instance and for an employee instance that reports to a manager instance. Reflexive relationship 1390 is formed using the employee entity 1302 as the source and destination entity. The "Manager Id." attribute of the employee entity 1302 is the relationship's source key. The "Employee Id." attribute of the employee entity 1302 is the relationship's destination key.

Reflexive relationship 1390, or "managerOf" relationship, can be recursive. For example, a first employee can report to a second employee who reports to a third employee. This relationship can continue until an employee has a null "Manager Id." indicating that employee does not report to another employee.

A flattened attribute can extend across multiple relationships. Any number of relationships can be traversed to flatten attributes. Referring to FIG. 8, for example, relationships 870, 872, and 874 can be combined to include an employee's business address in the employee entity 802. Using relationship 870, a relationship is created between the employee entity 802 and the department entity 862. Using relationship 872, the building entity 882 and department entity 862 are related. By combining relationships 870 and 872, it is possible to include the building location for an employee into the employee entity 802. Using the relationship between the building entity 882 and address entity 822, it is possible to include the address of the building in which an employee is located (i.e., the employee's business address) into the employee entity 802.

Flattened Relationship

In addition to flattening attributes, the present invention provides the ability to flatten relationships. Flattening a relationship gives a source entity access to relationships that a destination entity has with other entities. Referring to FIG. 8, employee entity 802 is related as the source entity to department entity 862 (the destination entity) via relationship 870. The destination entity of relationship 870 (department entity 862) is related to building entity 882 via relationship 872. Thus, the employee entity 802 is related to the building entity 882 via the department entity 862. Relationships 870 and 872 can be flattened such that employee entity 802 is effectively related to building entity 882 via a single relationship.

Figure 11:
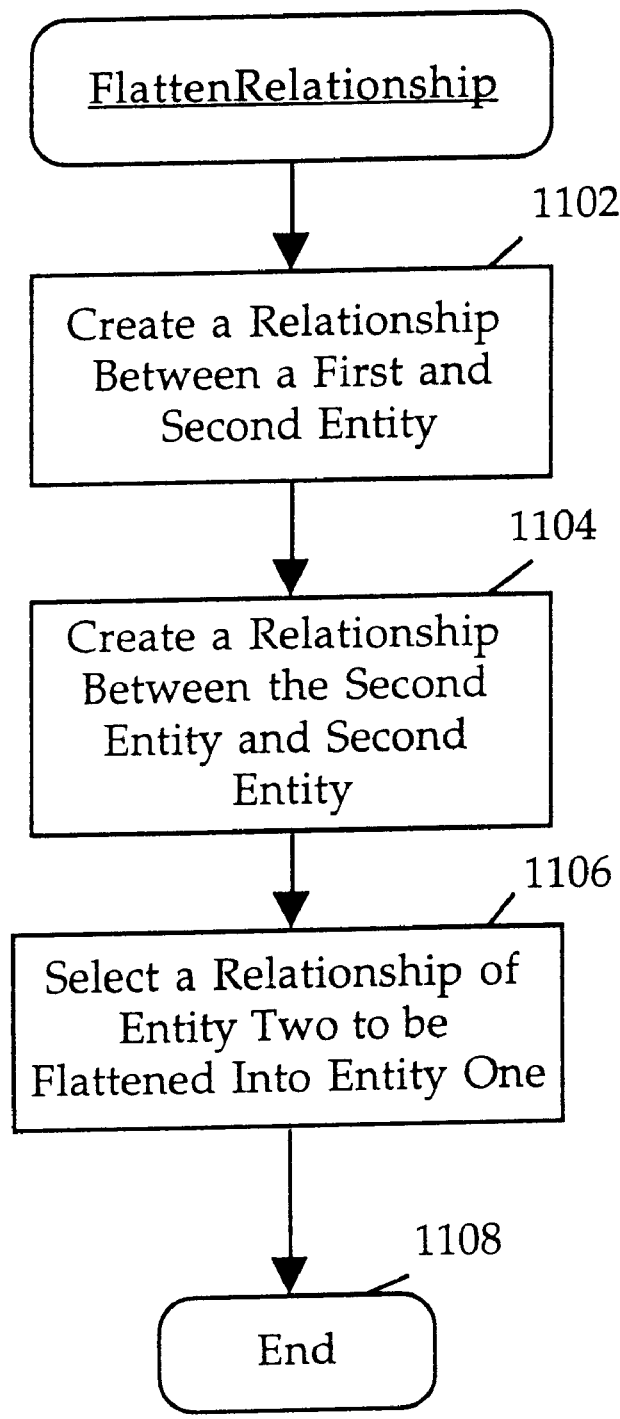
FIG. 11 provides a FlattenRelationship process flow.

FIG. 11 illustrates a FlattenRelationship process flow. At block 1102, a relationship is created between a first and second entity as described above with reference to flattening attributes. At block 1104, a relationship is created between the second entity and a third entity. At block 1106, a relationship of the second entity (e.g., the relationship between the second and third entities) is selected to be flattened. The FlattenRelationship process flow can be repeated to flatten additional relationships.

Figure 14A:
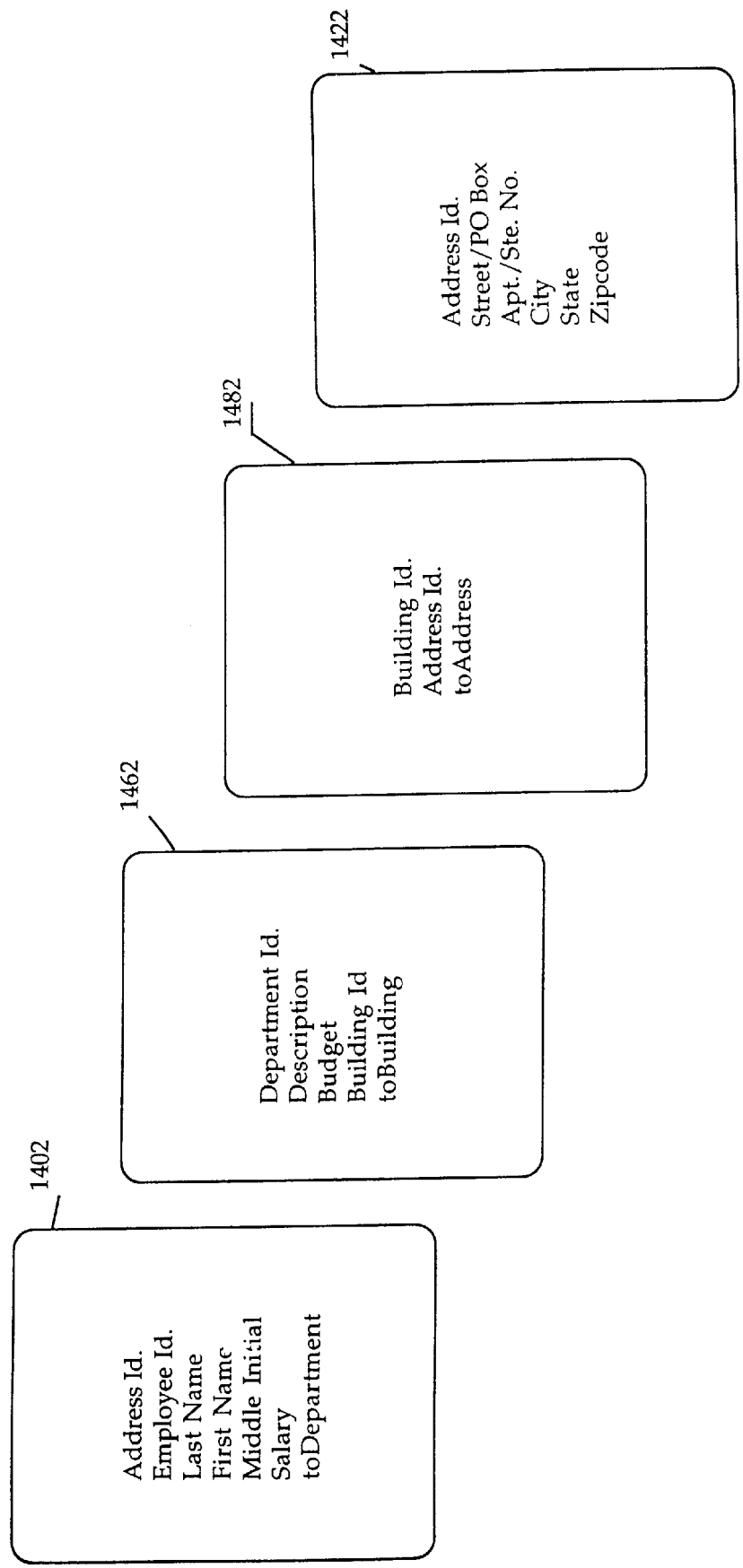
FIGS. 14A–14C illustrate the FlattenRelationship process flow from a user's perspective.
Figure 14B:
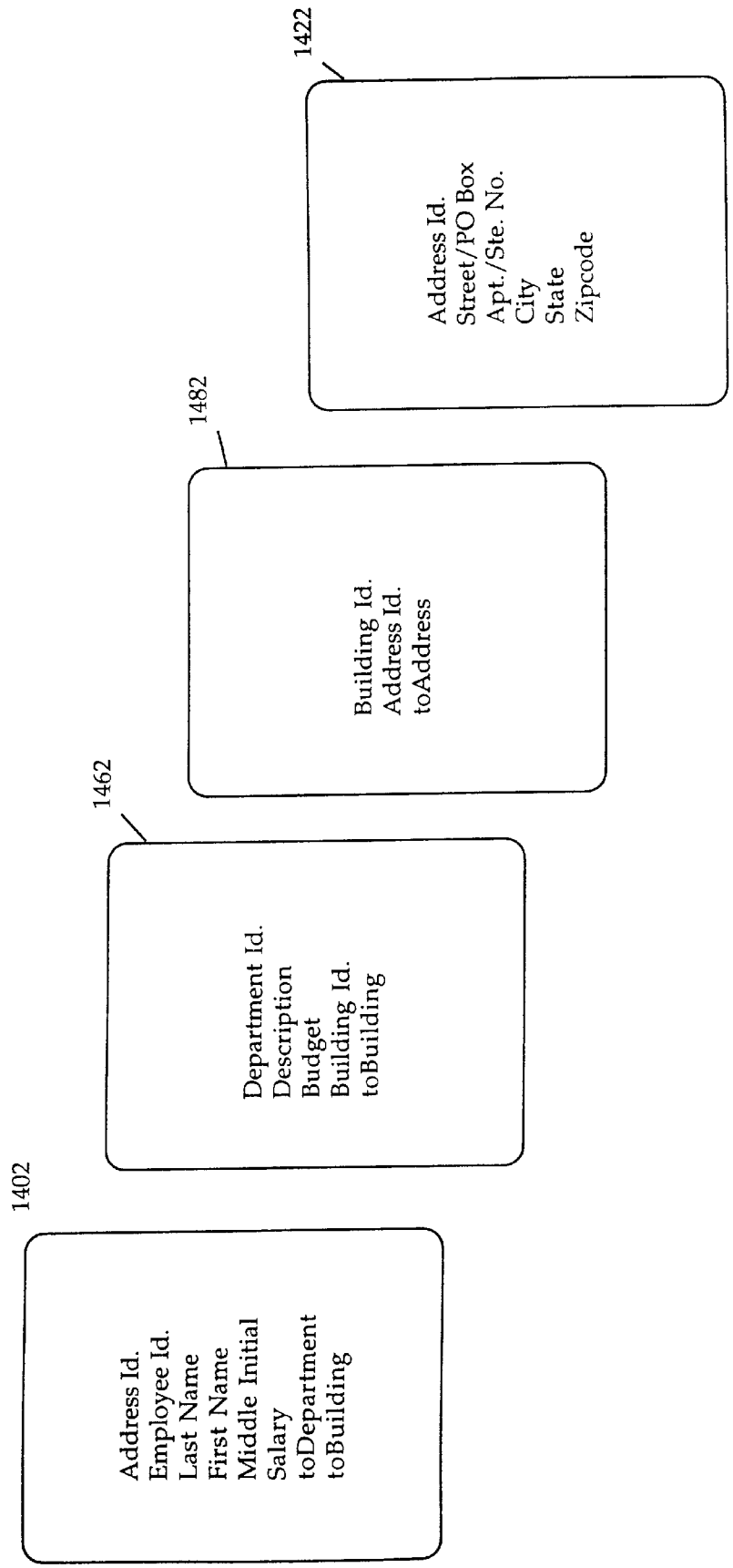
Figure 14C:
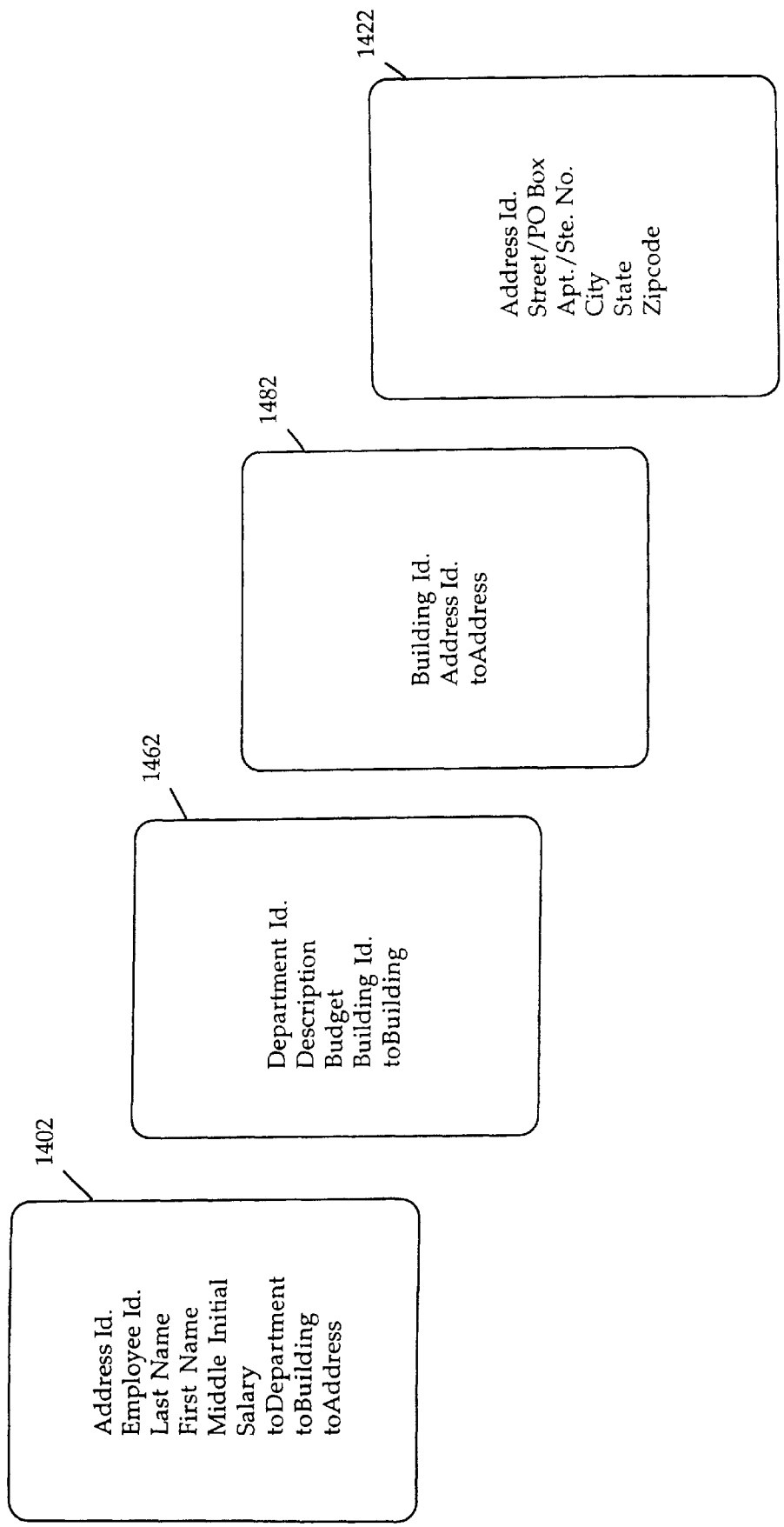

FIGS. 14A–14C illustrate the FlattenRelationship process from a user's viewpoint by selecting relationships provided in displays presented to the user in an interactive environment. FIG. 14 includes a graphical representations 1402, 1422, 1462, and 1482 of the employee entity 802, address entity 822, department entity 862, and building entity 882, respectively. Using the FlattenRelationship process, the user specifies a flattened relationship between the employee entity 802 and the address entity 822.

Referring to FIG. 14A, employee entity 1402, department entity 1462, and building entity 1482 have relationship attributes "toDepartment", "toBuilding", and "toAddress", respectively. The FlattenRelationship process is used repeatedly to create a flattened relationship between employee entity 1402 and address entity 1422.

The "toBuilding" relationship of department entity 1462 is selected and the flatten relationship operation is selected. Referring to FIG. 14B, the result of this process is the inclusion of a "tobuilding" relationship attribute in the employee entity 1402. A similar process is used to create a "toAddress flattened relationship in employee entity 1402. As illustrated in FIG. 14B, the "toAddress" relationship is selected from the building entity 1482, and the flatten relationship operation is selected. Referring to FIG. 14C, the result of this process is the inclusion of the "toAddress" flattened attribute in the employee entity 1402.

Fetch and Update

At runtime, objects are fetched and populated with data from a data source (e.g., DBMS). The model is used to map the data to the fetched objects. The model maps columns of the database to properties of the object. Therefore, the model can be used to bind a column's data values to a property (i.e., instance variable) of the object. A key-value communication protocol is used, for example, that identifies a key (e.g., column name) and a data value associated with the key. The key is used to identify the instance variable. Once the instance variable is identified, the value associated with the key is used to initialize the instance variable. The key-value coding communication protocol is more fully described in a co-pending U.S. Patent Application entitled "Dynamic Object Communication Protocol", Ser. No. 08/353,524, filed on Dec. 7, 1994 and incorporated herein by reference and is abandoned.

Objects are fetched all at one time, for example. Objects can also be fetched using a fetch loop. As objects are fetched, model relationships between the objects must be resolved. Relationships between objects are resolved, for example, by creating a "fault" object that stands in for an actual object. A "fault" object contains a pointer to the data that can be used to initialize an actual object that is instantiated to replace the "fault" object. An actual object is instantiated to replace the "fault" object when a message is sent to the "fault" object to which it can not respond. A more complete description of stand-in objects is provided in a co-pending U.S. Patent Application entitled "Method for Providing Stand-in Objects", Ser. No. 08/353,523, filed on Dec. 7, 1994 and incorporated herein by reference and is abandoned.

Whether or not objects are fetched one at a time or using a fetch loop, to fetch an object and populate the object with data from a DBMS, for example, the model is used to determine the association between the object and the DBMS table(s) and the association between object properties and columns of the DBMS tables. Using these associations, an SQL select statement, for example, is generated to select the columns from the tables to which the fetched objects are mapped. For example, the model is used to generate a select statement to fetch an employee object. The select statement selects a record from the employee table 402 comprising the columns Referring to FIG. 5, the employee object 524 includes a "Description" property that maps to the "Description" flattened attribute of the employee entity 902. When an employee object 524 is fetched from the DBMS, a join is performed using a select statement to populate an instance of the employee object 524. The "where clause" of the select statement contains a phrase that requires the relationship keys ("Department Id.") of the employee table 402 and department table 462 to be equal. That is, when an employee object 524 is fetched at runtime, the "Department Id." value of the employee object 524 is compared to the values of the "Department Id." column of the department table 462 to locate the desired department record. Once the desired department record is located, the properties of the employee object 524 that correspond to the flattened attributes of the employee model entity 802 from the department model entity 862 can be loaded into employee object 524.

Figure 15:
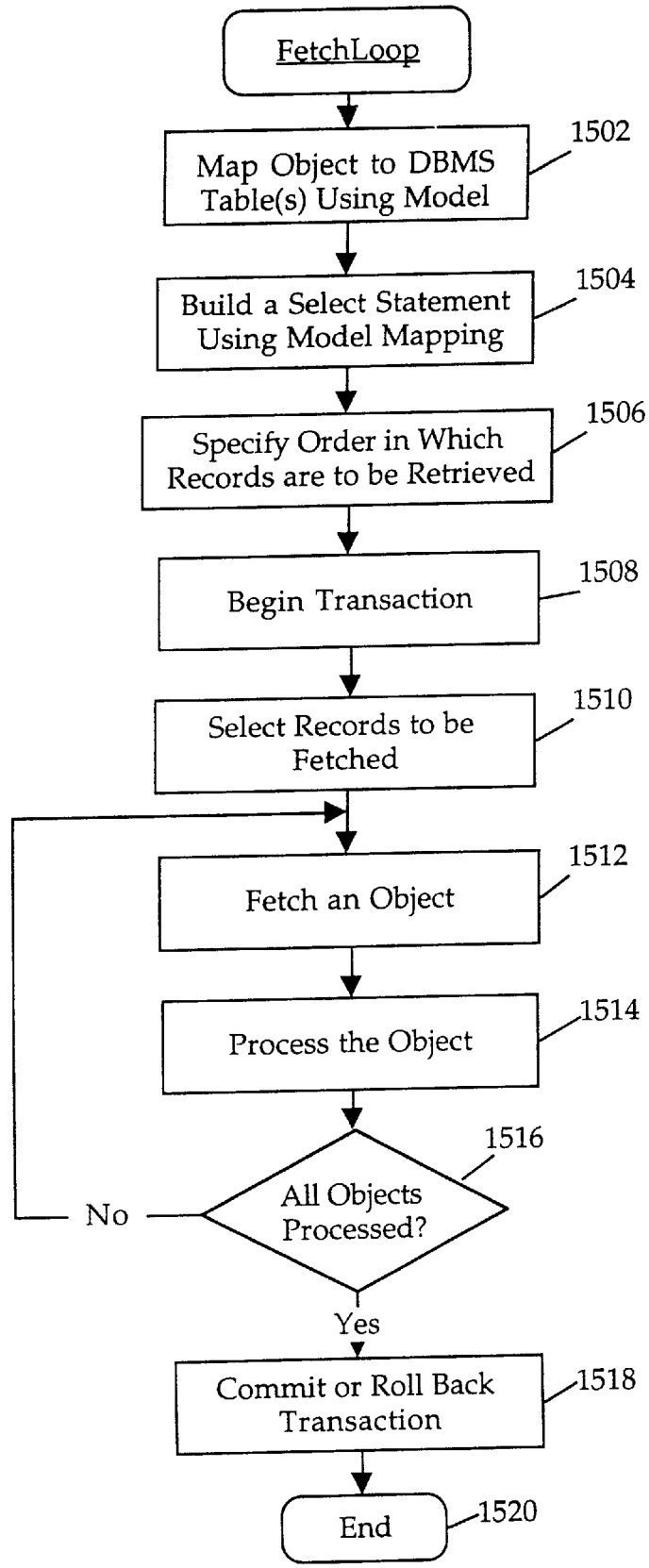
FIG. 15 provides a fetchloop process flow.

Fetching all of the objects at one time requires a significant allocation of memory to retain all of the objects until they are processed. Instead of fetching all of the objects at one time, the objects can be fetched as they are needed using a fetch loop. FIG. 15 provides a fetchLoop process flow. At block 1502, the model entity associated with the object to be fetched is examined to determine the table(s) and column(s) associated with the object to be fetched. Using the model entity definition, a select statement is generated to select the DBMS records needed to populate the objects. A fetch order of the records can also be specified at block 1506. A transaction is initiated at block 1508.

The records are selected using the select statement at block 1510. At block 1512, an object is fetched using a selected record to populate the object. At block 1514, the object is processed. The methods of the object manipulate the data of the object during processing, for example. Once object processing is completed, processing continues at decision block 1516. At decision block 1516 (i.e., "all objects processed?"), if all of the objects have not been processed, processing continues at block 1512 to fetch another object.

If it is determined, at decision block 1516, that all of the objects are processed, processing continues at block 1518. The model is used to map any changes made by an object to the DBMS. For example, an object's associated model entity is examined to identify the DBMS table(s) and column(s) modified by the object. The modifications are then propagated to the DBMS using the mapping provided by the model. The model is used to determine the tables that are affected by the modifications made by the object. SQL statements are generated to update the tables. Where an object is mapped to multiple tables of the database, for example, multiple SQL statements can be generated to update each table. At block 1518, the changes made to the DBMS by the object are either committed or rolled back. At block 1520, fetchLoop processing ends.

Thus, a method and apparatus for method and apparatus for mapping objects to multiple tables of a database has been provided.

What is claimed is:

1. A method of mapping object transparently to a data source stored in a storage medium in a computer system comprising the steps of:

independently defining an object class;

independently defining a schema for said data source, said schema defining being independent of said object class defining; and defining a model providing a mapping between properties of said object class and data of said data source schema, such that the mapping between said data source schema and said object class is transparent to said object class and said data source schema.

2. The method of claim 1 wherein said data source schema is a database schema.

3. The method of claim 2 wherein said model is comprised of at least one entity that has at least one attribute.

4. The method of claim 3 wherein said attribute is a simple attribute that maps directly to an item of data in said data source.

5. The method of claim 3 wherein said attribute is a derived attribute that does not directly map to an item of data in said data source.

6. The method of claim 3 wherein said model has a plurality of entities and a plurality of relationships between at least two of said plurality of entities.

7. The method of claim 1 further comprising the steps of:

defining a first entity of said model having a first attribute;

defining a second entity of said model;

defining a relationship between said first and second entities; and using said relationship to define said first attribute as an attribute of said second entity.

8. The method of claim 1 further comprising the steps of:

defining a first entity of said model;

defining a second entity of said model;

defining a first relationship between said first and second entities;

defining a third entity of said model;

defining a second relationship between said second and third entities; and defining a third relationship between said first and third entities using said first and second relationships.

9. A method of mapping an object transparently to a table of a database stored in a storage medium in a computer system comprising the steps of:

independently defining a property for an object class;

independently defining a first table having one or more attributes, said first table defining being independent of said property defining;

defining a model having an entity that corresponds with said first table;

defining in said entity a flattened attribute, said flattened attribute being an attribute of a second entity that corresponds with a second table; and associating said object with said first entity thereby associating said object with said first table and said second table.

10. The method of claim 9 further comprising the steps of:

generating, using said first entity's definition, a statement to fetch a record from a database;

instantiating an instance of said object class and loading said property of said instance with a data value contained in said record;

modifying said property using one or more methods of said object; and using said first entity's definition to propagate said modification made by said object to said first and second tables.

11. An article of manufacture comprising:

a computer usable medium having computer readable program code embodied therein for mapping an object transparently to a data source comprising:

computer readable program code configured to cause a computer to independently define an object class;

computer readable program code configured to cause a computer to independently define a schema for said data source, said schema defining being independent of said object class defining; and computer readable program code configured to cause a computer to create a mapping between said object class and said data source schema using a mapping model, said mapping between said data source schema and said object class transparent to said object class and said data source schema.

12. The article of manufacture of claim 11 wherein said object class includes a property, said program code configured to cause a computer to create further comprising:

computer readable program code configured to cause a computer to create and entity in said mapping model;

computer readable program code configured to cause a computer to relate said entity to said schema;

computer readable program code configured to cause a computer to create in said model an attribute for said entity; and computer readable program code configured to cause a computer to relate said entity to said property.

13. The article of manufacture of claim 12 wherein said data source is a relational database having a table, said program code configured to cause a computer to relate further comprising:

computer readable program code configured to cause a computer to relate said entity to said table in said relational database.

14. The article of manufacture of claim 12 wherein said data source is a relational database having a table, said program code configured to cause a computer to relate said entity to said schema further comprising:

computer readable program code configured to cause a computer to relate said attribute of said entity to a column of said table in said relational database.

15. The article of manufacture of claim 11 wherein said mapping model includes a plurality of entities, each of said plurality of entities having a plurality of attributes and a plurality of relationships, wherein at least one of said relationships exists with at least one entity of said mapping model.

16. The article of manufacture of claim 11 wherein said mapping model includes a plurality of entities, each of said plurality of entities having a plurality of attributes and a plurality of relationships, wherein at least one of said plurality of relationships is a reflexive relationship that exists between two of said plurality of attributes in one of said plurality of entities.

17. The article of manufacture of claim 11 wherein said mapping model includes a plurality of entities, each of said plurality of entities having a plurality of attributes and a plurality of relationships, wherein at least one of said plurality of relationships is a flattened relationship that relates two of said plurality of entities via one or more intermediate entities.

18. The article of manufacture of claim 11 wherein said mapping model includes a plurality of entities, each of said plurality of entities having a plurality of attributes and a plurality of relationships, wherein one of said plurality of relationships relate s at least one of said plurality of objects to multiple schema entities of s aid data source.

19. The article of manufacture of claim 18 wherein a schema entity is a database table.

20. The article of manufacture of claim 18 further comprising:

computer readable program code configured to cause a computer to identify a first relationship key in a first of said plurality of entities;

computer readable program code configured to cause a computer to identify a second relationship key in a second if said plurality of said entities; and computer readable program code configured to cause a computer to define a traversal path using said first and second relationship keys.

\* \* \* \* \*